United States Patent [19]

Ahmadi et al.

[11] Patent Number: 5,008,878

[45] Date of Patent: Apr. 16, 1991

[54] HIGH-SPEED MODULAR SWITCHING APPARATUS FOR CIRCUIT AND PACKET SWITCHED TRAFFIC

[75] Inventors: Hamid Ahmadi, Somers, N.Y.; Johannes G. Beha; Wolfgang E. Denzel, both of Waederswil, Switzerland; Antonius P. Engbersen, Richterswil; Ronald P. Luijten, Oberrieden, both of Switzerland; Charles A. Murphy, Raleigh, N.C.; Erich Port, Rueschlikon, Switzerland

[73] Assignee: International Business Machines Corporation, Armonk, N.Y.

[21] Appl. No.: 257,656

[22] Filed: Oct. 14, 1988

[30] Foreign Application Priority Data

Nov. 30, 1987 [EP] European Pat. Off. ............ 87115341

[51] Int. Cl.[5] .................................................. H04J 3/26
[52] U.S. Cl. ...................................... 370/60; 370/94.3
[58] Field of Search ............... 370/60, 94, 110.1, 60.1, 370/94.1, 94.2, 94.3

[56] References Cited

U.S. PATENT DOCUMENTS

| | | |
|---|---|---|
| 4,314,367 | 2/1982 | Bakka et al. ............... 370/60 |
| 4,566,095 | 1/1986 | Devault et al. ............ 370/60 |
| 4,623,996 | 11/1986 | McMillen .................. 370/60 |
| 4,625,306 | 11/1986 | Newman .................... 370/16 |
| 4,679,190 | 7/1987 | Dias et al. ............... 370/60 |
| 4,698,802 | 10/1987 | Croke et al. .............. 370/60 |
| 4,754,451 | 6/1988 | Eng et al. ................ 370/60 |
| 4,782,478 | 11/1988 | Day, Jr. et al. .......... 370/60 |

OTHER PUBLICATIONS

"Applications of Self-Routing Switches to Lata Fiber Optic Networks", Chet Day, Mar. 1987, pp. 519-523.
"The Knock-Out Switch: A Simple, Modular Architecture for High-Performance Packet Switching", Y. S. Yeh, Mar. 1987, pp. 801-808.
"Switching Techniques for Asyochronous Time Division Multiplexing (or Fastpacket Switching)", Mar. 1987, pp. 367-372, M. Quinquis.
"Integration of Circuit/Packet Switching by a Senet Concept," G. J. Coviello et al., *Proceedings of the National Telecommunications Conference NTC*, 1975, pp. 42-12 to 42-17.
"An Experimental Synchronous Composite Switching System", T. Takeuchi et al., Proceedings of the IEEE 1986 International Zurich Seminar on *Digital Communications*, pp. 149-153.

Primary Examiner—Douglas W. Olms
Assistant Examiner—Melvin Marcelo
Attorney, Agent, or Firm—Keith Stephens

[57] ABSTRACT

In a switching system interconnecting transmission links (21-i, 23-i) on which circuit switched (CS) and packet switched (PS) information is transferred, a switch fabric (11) is provided which interconnects a plurality of input ports (15-i) to a plurality of output ports (19-i). The information arriving on incoming links is converted in switch adapters (13-i) to uniform minipackets, each having a routing address designating the required output port. The switch fabric consists of parallel equal switching slices, e.g. binary routing trees (71), which transfer in a non-blocking manner each minipacket from its input port to one output port in response to the routing address. Collecting means (73, 75) are provided at each output port for accepting the minipackets arriving from the different input ports.

8 Claims, 14 Drawing Sheets

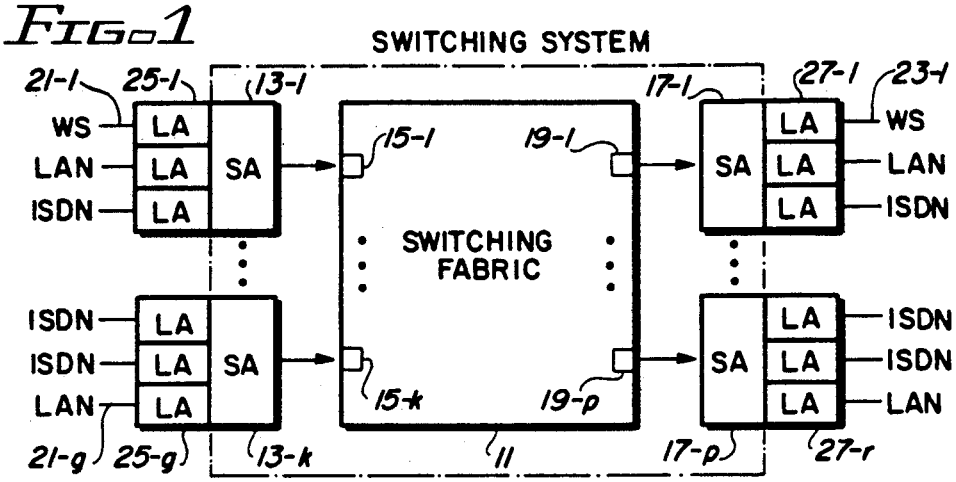
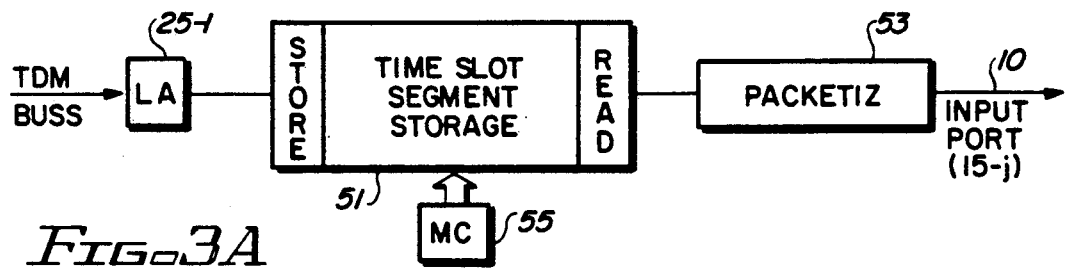
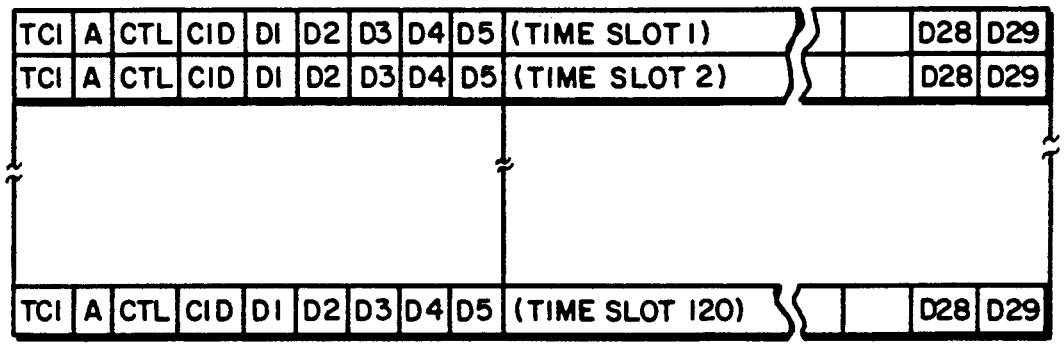

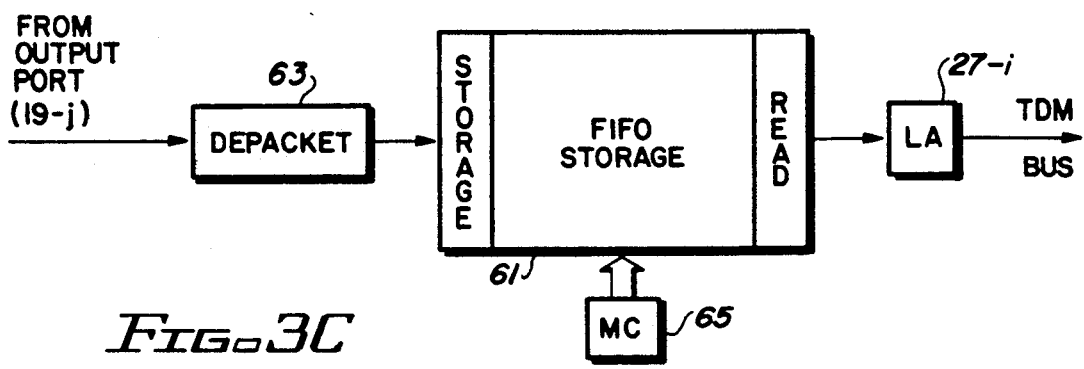
_FIG. 3C_
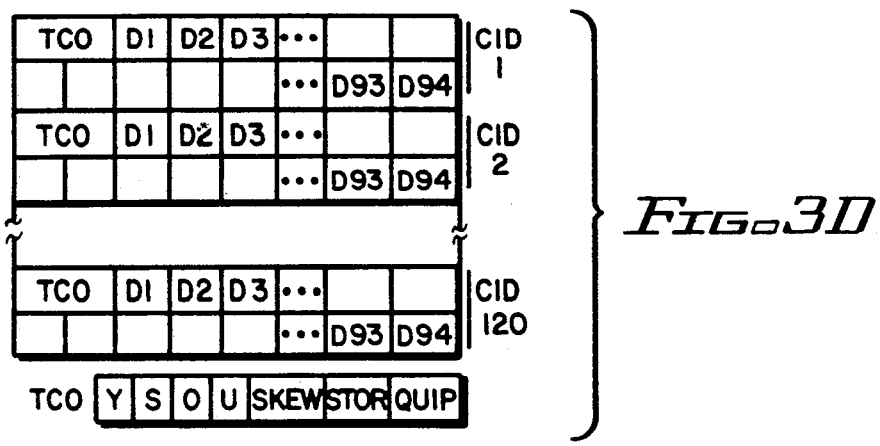
_FIG. 3D_
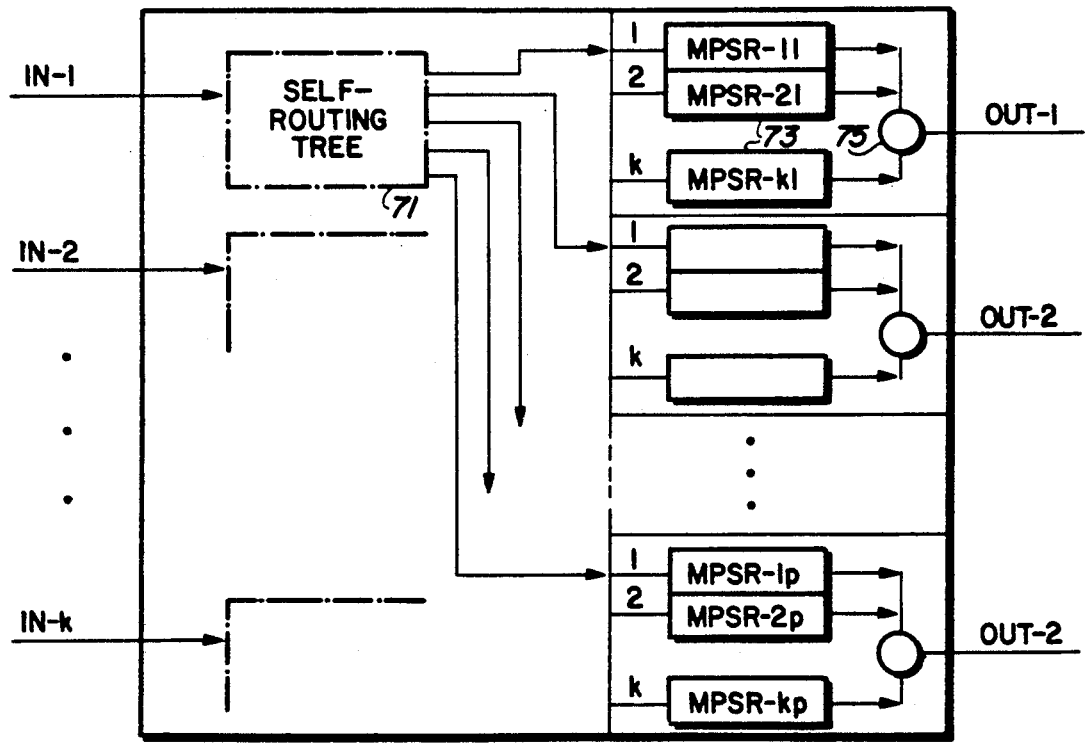
_FIG. 4_

C000    CONTROL BIT

C001  
C002  } MODULE SELECT  
C003

C004  
C005  
C006  } OUTPUT PORT SELECT  
C007

C008  
⋮ } 56 BITS FOR SHORT MP  
   OR  
C063  56 BITS AS 1ST SEGMENT OF LONG MP

———————————————————

C064  
⋮ } 64 BITS  
   2ND SEGMENT OF LONG MP  
C127

C128  
⋮ } 64 BITS  
   3RD SEGMENT OF LONG MP  
C191

C192  
⋮ } 64 BITS  
   4TH SEGMENT OF LONG MP  
C255

*FIG. 9*

HIGH-SPEED MODULAR SWITCHING APPARATUS FOR CIRCUIT AND PACKET SWITCHED TRAFFIC

BACKGROUND OF THE INVENTION

1. Field of the Invention

The present invention relates to switching apparatus for interconnecting a plurality of incoming and outgoing transmission links in the nodes of a communication network, or for exchanging data between incoming and outgoing computer and workstation connection links. In particular, the apparatus directs circuit switched as well as packet switched traffic from the incoming links selectively to the outgoing links.

2. Description of the Prior Art

Fast switching of information, be it samples of analog signals or alphanumeric data, is an important task in a communication network. The network nodes in which lines or transmission links from various directions are interconnected for exchanging information between them are often the cause of delay in the transmission. If much traffic is concentrated in a node, and if in particular most of the traffic passes through a few of the links, increased delays or even loss of information are encountered.

It is therefore desirable to have switching nodes or exchanges which are fast and practically non-blocking. Such switching nodes should further be able to accommodate different kinds of traffic such as information from circuit switched (CS) voice channels or data from packet switched (PS) links. Various solutions for exchanges or switching apparatus have been proposed in the literature and in patents.

The article "Integration of Circuit/Packet Switching by a SENET Concept" by G. J. Coviello et al., published in the Proceedings of the National Telecommunications Conference NTC 1975, pp. 42-12 to 42-17 describes a nodal switch for transfer of circuit switched and packet switched information between trunk lines. Input demultiplexers and output multiplexers connect the trunk lines to one common bus for CS traffic and another common bus for PS traffic. Addressed words are transferred sequentially over these busses.

The different handling of PS and CS traffic prevent a uniform internal structure, and the carrying of an address for each single word (i.e. byte) of CS traffic creates much overhead on the bus. Furthermore, a significant portion of the switching functions is done in the multiplexers and demultiplexers which perform TDM switching operations for assigned time slots, each assignment being kept for the duration of the respective CS connection.

U.S. Pat. No. 4,314,367 entitled "Switching Circuit for Digital Packet Switching Network" discloses a switch structure for interconnecting incoming and outgoing links in a packet network node. Each such node switch comprises a two-stage interconnection pattern connecting all inputs to all outputs, and each packet is routed directly from an input to the correct output on the basis of its address. No transfer of circuit switched information is provided as this is a pure packet switching network.

A paper "An Experimental Synchronous Composite Switching System" by T. Takeuchi et al., Proceedings of the IEEE 1986 International Zurich Seminar on Digital Communications, pp. 149-153, describes a switch structure for interconnecting a plurality of trunk lines. The switch basically comprises plural synchronous, slotted transmission rings to which each of the trunks is connected by a switch module. Each switch module can insert addressed packets into empty time slots, and the packets are extracted at the destination switch modules. Both packet switched and circuit switched data can be transferred. However, TDM switching operations with random reordering according to destinations are required separately in each of the trunk switches, and combination of equal switches of this type to configure larger switch systems is not possible.

In German Published Patent Application 2,441,099 entitled, "System zur Vermittlung und Uebertragung digitaler Nachrichten ueber ein Stufenvermittlungsnetzwerk (System for switching and transferring digital messages through a staged switching network)" a packet switching network is disclosed in which each packet has a self-routing address of which each field is associated with a particular node and determines which output is to be taken from that node. This publication does not show the integration of different services and is not suited for transfer of circuit switched information.

The prior art does not show a switching node in which both CS and PS traffic are treated internally equally, and which would allow a modular expansion with equal modules, without requiring higher speed transmission circuitry within the switch modules.

SUMMARY OF THE INVENTION

It is a primary object of the invention to devise a fast switching apparatus which can accommodate very high speed circuit switched and packet switched traffic in a unified manner.

Another object of this invention is a high speed switching apparatus supporting a variety of interfaces such as ISDN services, as well as high speed LAN (local area network) interconnections and high speed data processors or workstations.

A further object of the invention is to provide a switch for interconnecting transmission links, which has a unified architecture and a unified protocol and control algorithm within the switch for both, circuit and packet switched information.

A still further object is a switching apparatus for interconnecting transmission links, which can be constructed from basic uniform switching modules where each module can be implemented on a single VLSI chip to allow modularity and flexibility of expansion.

These objects are achieved by the invention which provides, in a switching apparatus, the generation of uniform minipackets, each having a local routing address, and a self-routing switching fabric of parallel switch slice modules, for transferring each minipacket in response to the local routing address from an input port of said switch fabric to an output port, where it is queued for further transmission.

The construction from uniform basic building blocks allows for modularity and flexibility of expansion. Because of the self-routing technique used, control of the switch is not concentrated in one processor element but rather distributed. The switch service distribution between packet and circuit traffic is completely dynamic and intrinsic.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 1 is a schematic block diagram of the switching apparatus in its environment;

FIG. 2A and 2B show examples of minipacket formats;

FIG. 4 is a schematic representation of a first embodiment of the switch;

FIG. 9 is a listing of the bit clock signals used in the switch system;

DESCRIPTION OF THE PREFERRED EMBODIMENT OF THE INVENTION

Basic Structure of the Switch

Figure 3E:
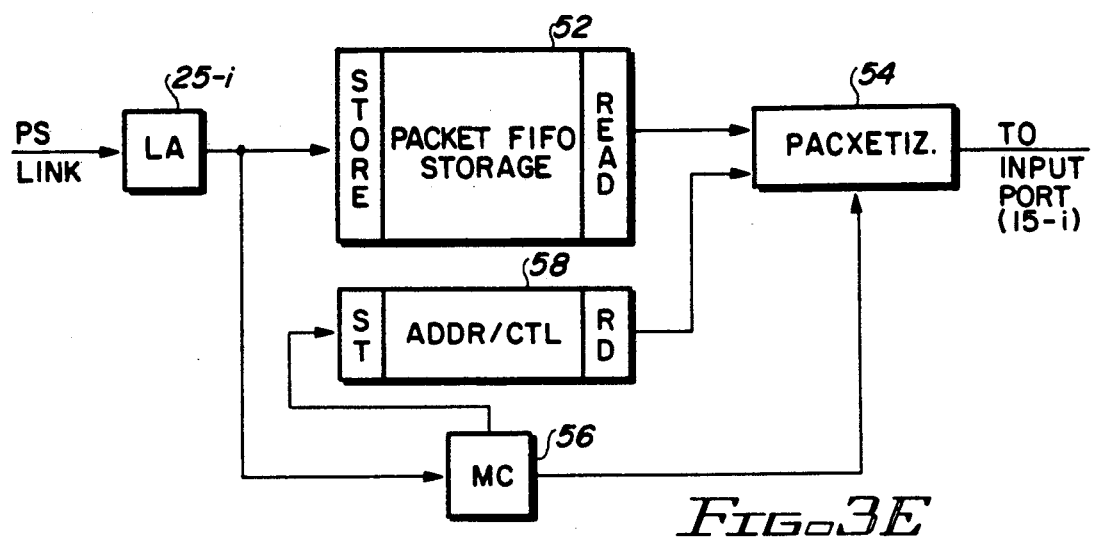
FIGS. 3 (A ... F) show block diagrams of the switch adapter circuitry at the input and output ports, respectively, and the information organization in the storage blocks of these adapters for generating minipackets and for depacketizing the information.

FIG. 1 shows the basic switching system configuration. The system consists of a switch fabric 11, input switch adapters 13 (13-1 ... 13-k) which are connected to the switch fabric at input ports 15 (15-1 ... 15-k), and output switch adapters 17 (17-1 ... 17-p) which are connected to the switch fabric at output ports 19 (19-1 ... 19-p).

Incoming and outgoing transmission links 21 (21-1 ... 21-q) and 23 (23-1 ... 23-r) are connected to the switch system by line (link) adapters 25 (25-1 ... 25-q) and 27 (27-1 ... 27-r), respectively. The transmission links carry circuit switched or packet switched traffic from and to attached units such as work stations, telephone sets, or the like (links designated WS), from and to local area networks (links designated LAN), from or to Integrated Services Digital Network facilities (links designated ISDN), or from and to any other communication systems. Furthermore, processors may be attached directly to switch adapters 13 and 17. The line adapters (LA) and switch adapters (SA) have a common interface.

At the input switch adapters, various services from packet switched and circuit switched interfaces are collected and converted into uniform minipackets (having one of several possible fixed lengths), with a header containing routing information designating the required output port (and outgoing link) of the switch. Some details on the minipacket format and on minipacket generation in the input switch adapters and on depacketization in the output switch adapters will be given in the next sections.

The switch fabric routes the minipackets via a fast self-routing interconnection network from any input port to any output port. The structure of the self-routing network is such that minipackets can be routed simultaneously internally without any conflicts.

The heart of the switching system is the switch fabric. Two different implementations are considered and will be described separately. In one implementation, the switch fabric comprises a self-routing binary tree for each input port, connecting the respective input port to all output ports; the switch fabric comprises k such trees in combination (if k input ports are provided). In the other implementation, a bus structure with an output RAM is provided as a slice for each output port, connecting all input ports to the respective output port; the switch fabric comprises p such slices in combination (if p output ports are provided). More details on these implementations will be described in later sections.

Minipacket Structure:

The minipacket structure is illustrated in FIG. 2 (A and B). The simplest form of the minipackets is shown in FIG. 2A. It comprises as first portion the routing address A (1 byte) designating the required output port. The second portion is a control field CTL (1 byte) which is used by the switch fabric; it contains e.g. information designating the length (L) of the minipacket and identifying the priority (P) of the information.

The last portion of each minipacket is the information field. It contains the data bytes or voice samples which were received on an incoming transmission link and have to be delivered to an outgoing transmission link.

The format of FIG. 2A is suitable for switches having only one switching stage and in which only one link is attached to each port of the switch fabric. For multiple-stage switches and for switches having several links or channels per switch fabric port, an extended format must be used as is shown in FIG. 2B. Here, the address consists of several bytes A1, A2, A3 (and more, if necessary). One of the address bytes (e.g. A1) is at the minipacket head for controlling routing through one switch stage. Between the stages, address byte positions are shifted so that in the next stage, another address byte (e.g. A2) is at the minipacket head and controls routing. The control byte CTL would always remain in the second position.

In addition, a channel identification byte CID may be provided for distinguishing between the different transmission links connected to the same output port and between the different time slots/channels of each TDM link (bus). This byte is to be used by the output switch adapter and thus would be transferred through the switch fabric output port with the information field of a minipacket. The CID byte would be shifted like the other address bytes, to be in the first position when needed.

Generation of Minipackets in Input Switch Adapters and Depacketization in Output Switch Adapters:

FIG. 3 shows block diagrams of the circuitry in an input switch adapter 13-$i$ and in an output switch adapter 17-$i$, and the information organization used. In FIG. 3A there can be seen the input switch adapter circuitry for attaching a TDM link, which consists of a storage block 51, a packetizer element 53, and a micro controller 55. Information arriving on the link (TDM bus) is adapted in line adapter 25-$i$ and then distributed in storage 51 for forming a plurality of minipackets; packetizer element 53 transfers each full minipacket from storage 51 to the switch fabric input port (15-$i$) associated with the respective adapter.

The read and write operations in the input switch adapter circuitry of FIG. 3A are now explained with reference to FIG. 3B which shows the information organization in storage 51. The storage comprises two sections for alternate usage, and the contents of one section is shown in FIG. 3B. It comprises one storage segment for each time slot of the TDM bus, e.g. one hundred-twenty segments. Each time slot segment contains the following fields:

TCI: holding a segment control word the contents of which is shown in the lower portion of FIG. 3B
A: Address byte designating the required output of the switch (as already explained above)
CTL: the minipacket control byte already mentioned above
CID: Channel identification (designating the destination output link and the time slot on the output TDM bus)
Di: Data bytes Instead of only one address byte as shown in FIG. 3B, the output address may comprise a plurality of address bytes as was mentioned above. The number of data bytes is a design choice and may be e.g. twenty-nine if the minipackets hold thirty-two bytes (including three bytes for A/CTL/CID), or five data bytes for short eight-byte minipackets. Control byte (CTL) and addressing bytes (A, CID) in each time slot segment are prestored, and their contents is determined in advance by the micro controller 55, e.g. when a connection is set up. The contents of segment control word TCI is also determined by the micro controller.

Consecutive bytes arriving on the input of storage 51 are placed in equal-numbered byte positions of consecutive time slot segments. Thus, all bytes of one TDM cycle are distributed to the time slot segments in storage and will all occupy the same byte positions Di. In the next TDM cycle, byte positions D($i+1$) will be filled, and so on. When all byte positions have been used (e.g. D29 was filled in the last cycle), a read-out operation is started for that storage section, and byte insertion is switched over to the other section of storage 51. If short minipackets are used, read-out is started already when byte position D5 was filled.

Reading out is done by packetizer element 53. It transfers the contents of each time slot segment, except for control word TCI, as a minipacket to the switch fabric input port, and thus empties one time-slot segment after the other until a minipacket for the last one (No. 120 in this case) was transferred. Then the read-out operation switches to the other storage section which was filled during the last TDM cycle.

The first bit Y of control word TCI is an active/idle indicator. If it is zero, no data are inserted in the respective time slot segment and no read-out is done by packetizer 53. The indicator bit is set to one by microcontroller 55 when a connection is established for the respective TDM channel (slot). All other TCI bits are not used in the present example.

For the transfer of minipacket contents from switch fabric output ports to TDM communication links, a similar arrangement is used. FIG. 3C shows a block diagram of the circuitry for a TDM link in an output switch adapter 17-$i$. It comprises a storage block 61 whose output is connected to the line adapter 27-$i$ of the respective outgoing communication link. A depacketizer element 63 is connected between the output port of the switch fabric and the input of storage 61. Microcontroller 65 is provided for the management of storage 61.

The information organization in storage 61 is shown in FIG. 3D. A plurality of FIFO buffers is provided, one for each TDM channel (slot), and can be identified by the channel identifier CID in each minipacket. Each FIFO buffer comprises a buffer control word TCO whose format is shown in the lower portion of FIG. 3D, and a number of data byte fields Di whose total capacity corresponds to several minipackets (e.g. ninety-four bytes per FIFO buffer). For each minipacket appearing at the associated output port, depacketizer element 63 inspects the channel address CID, selects the respective FIFO buffer, eliminates the non-data bytes of the minipacket, and stores the data bytes in consecutive empty fields of the selected FIFO buffer.

At the output side of storage 61, FIFO buffers are served cyclically and one data byte Di is read from each FIFO buffer per cycle and transferred to the line adapter so that it is transmitted in the correct time slot of the TDM trunk. Contents of the TCO control word is as follows: Field Y contains an active/idle indicator and is set to one by depacketizer 63 when the respective buffer receives valid data bytes to be transferred. If this bit is zero, no data bytes are transferred to the TDM bus. The status of bit (S) indicates whether a skew is pending (to be explained below). Bits O and U indicate whether an overflow or underflow occurred in the FIFO buffer. Field "STOR" contains the address of the byte field where the next data byte is to be stored, and its contents is increased by depacketizer 63 after each byte storing operation. Field "OUTP" contains the address of the data byte field from where the next byte is to be read for transfer to the TDM bus. Its contents is also increased by one after each byte read operation.

The field "SKEW" is provided to allow initial partial filling of each FIFO buffer so that when some jitter occurs, underflow of the buffer will be avoided. The contents of this field is the number of bytes which should be stored initially before any read-out starts. Microcontroller 65 initially sets all S bits in TCO words to one thus preventing read-out. It compares for each FIFO buffer the numbers stored in "SKEW" and "STOR", and when the store address exceeds the skew number, the S bit is reset to zero thus allowing the start of read-out operations for the respective buffer.

Packet switched communication can be effected over virtual TDM channels and in this case data packets can be handled the same way as was just described. These virtual channels are established in advance and thus the micro controller can set up the contents of TCI words accordingly. However, an alternative solution is described below.

Input switch adapter circuitry for generating minipackets from normal data packets received on packet switched channels is shown in the block diagram of FIG. 3E. This circuitry comprises packet FIFO storage block 52, a packetizer element 54, micro controller 56, and an additional address/control storage block 58.

When a packet arrives through link adapter 25-i, its destination address (and other control information) is evaluated by micro controller (MC) 56 which contains prestored tables associating packet destination addresses with local routing addresses (for switch output ports). MC 56 stores the required local routing address (and control information and CID) in storage block 58.

The whole arriving packet, including its destination address, source address, control information, etc. is stored without modification in FIFO storage 52. MC 56 detects the length of the packet and holds this information available. Packetizer 54 forms minipackets (as shown in FIG. 2) by extracting address and control bytes from storage block 58 and appending the necessary number of packet bytes from FIFO storage 52. It sets respective marker bits in each minipacket control byte for distinguishing first, intermediate and last minipacket of each sectioned large packet.

Figure 3F:
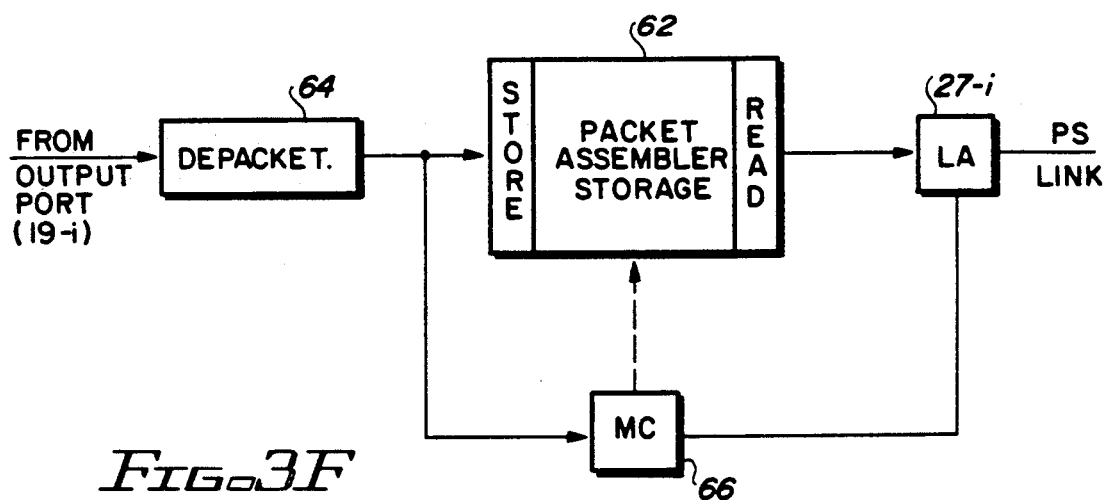

Output switch adapter circuitry for reassembling normal packets from minipackets is shown in the block diagram of FIG. 3F. This circuitry comprises a packet assembler storage block 62, depacketizer element 64, and micro controller 66.

The storage block is organized in several FIFO buffers, and the depacketizer inserts the first minipacket of each user packet to be reassembled into a new empty FIFO buffer. Further (intermediate) minipackets are inserted in the following spaces of the same FIFO buffer, and when the last minipacket is inserted, the depacketizer gets a new FIFO buffer ready for the next "first" minipacket (of another user packet) which it will receive. Thus, each user packet gets reassembled in a separate FIFO buffer.

When several packet switched links or channels are attached to the same output port, they are distinguished by the CID byte, and several storage blocks 62 will be provided, one for each output link/channel (as is explained below).

In FIG. 3, separate storage and control units were shown for the input switch adapter and the output switch adapter (FIG. 3A/C/E/F). It is of course possible to provide for the incoming and outgoing portions of one TDM trunk a single micro controller executing the tasks of micro controllers 55 (56) and 65 (66), and a single storage unit combining the contents of storage blocks 51 (52) and 61 (62), i.e. including two storage sections as shown in FIG. 3B plus one FIFO buffer arrangement as shown in FIG. 3D, or a packet FIFO storage plus a packet assembler storage.

Arrangement when several links are connected to the same input switch adapter (as shown in FIG. 1): If plural links are connected to the same input port/switch adapter, a respective number of storage blocks 51 (or 52) as the one shown in FIG. 3A (and in FIG. 3E) must be provided. They are all connected to a single packetizer element 53' which serves all the storage blocks 51 (and 52) in a round-robin fashion. At the output side, a similar arrangement is provided: A plurality of storage blocks 61 (or 62), one for each output TDM (or packet) link, is served by a single depacketizer element 63'. This depacketizer uses one portion of the minipacket address (shown in FIG. 2B as CID) for selecting one of the storage blocks 61/62, and for the TDM case it can then use the remaining portion of the CID for selecting one FIFO buffer.

First Embodiment of Switch Fabric Module (A) Principles:

In the first embodiment, the switch fabric module consists of a self-routing decoder tree (routing tree) 71 for each input port as is shown schematically in FIG. 4. The tree has one input branch at the respective input port (e.g. IN-1), and it has one separate output branch at each of the output ports (e.g. OUT-1 . . . OUT-p). At each output branch of a routing tree, there is provided one minipacket shift register 73 (MPSR), e.g. MPSR-11, MPSR-12, . . . MPSR-1p. All minipacket shift registers associated with one output port, e.g. MPSR-11, MPSR-21, . . . MPSR-k1 for output port OUT-1, form a block of shift registers whose outputs are connected, via an output server 75, to the associated output port of the switch and thus to the corresponding output switch adapter. Each minipacket appearing at an input port is automatically gated, in response to the bits (bytes) of the output address it carries, through the routing tree to the MPSR at the desired output port where it is intermediately stored. The associated output server reads out sequentially the minipackets from all the MPSRs it serves, to the respective output port so that they enter the corresponding output switch adapter one after the other. A pair of minipacket shift registers which are used alternatingly is provided at each output branch of each decoder tree so that a new minipacket can be received from the tree while the previous one is waiting to be read out by the respective server.

Figure 5:
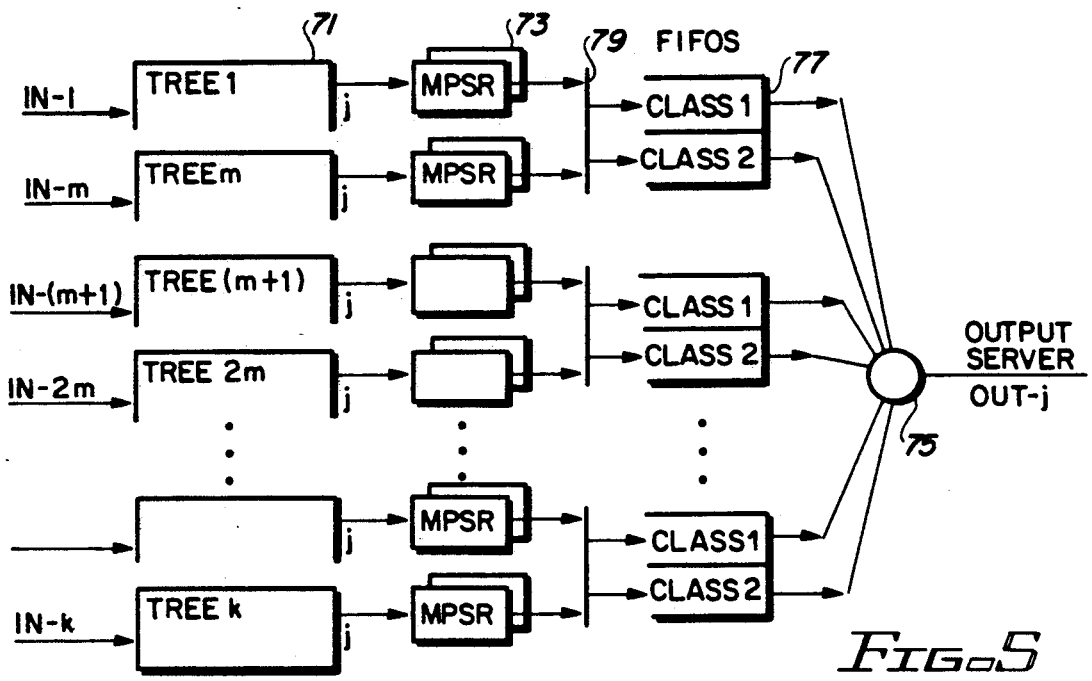
FIG. 5 shows schematically the overall structure of the switch fabric used in the first embodiment.

To avoid loss of minipackets in situations where much of the traffic trough the switch is concentrated on one or a few output ports, output FIFO (first-in first-out) queueing buffers can be provided as is shown in FIG. 5. For each group of m MPSR registers (register pairs) at an output port, there is provided one pair of FIFO buffers 77. The first buffer of each pair is for traffic having a higher priority (class one), e.g. circuit switched traffic which must be dispatched within a given cycle time, and the second FIFO buffer is for lower priority (class zero) traffic, e.g. packet switched traffic which may suffer some delay. The contents of each MPSR of a group is gated through gating means 79 to one of the two FIFO buffers in response to a priority bit contained in the control information field of the respective minipacket. All of the FIFO buffers associated with one output port are read out by the respective output server 75 for sequentially transferring minipackets to the output port. Class one FIFO buffers must be served first; only if no minipacket is waiting any more in a class one buffer can the class zero buffers be served. It is possible of course to provide only a single pair of FIFO buffers per output port if such buffers have enough capacity for the traffic from all inputs.

Figure 6:
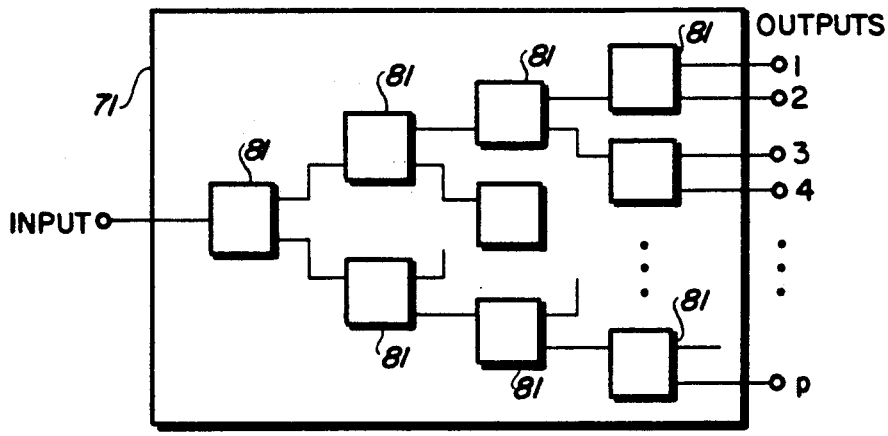
FIG. 6 shows the basic structure of one single tree of the switch fabric of FIG. 5.

Principles of one routing tree (self-routing decoder tree) will now be described in connection with FIGS. 6 and 7. The tree 71 is a multi-stage network with a plurality of branching nodes, and one switching element 81 is provided at each node. Each switching element has one input and two outputs and gates the data entering it to one of its two outputs. The selection of the output is made by a single bit of the minipacket routing address. Thus the network acts as a binary tree which gates minipackets from the input branch to one single output branch without any delay or intermediate storage.

Figure 7:
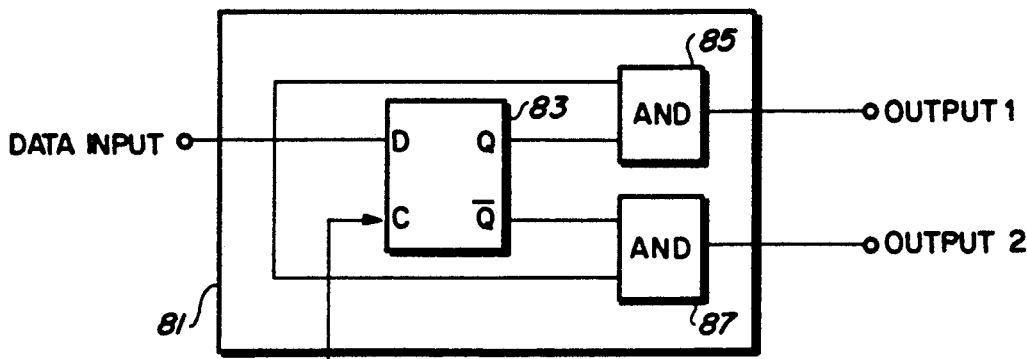
FIG. 7 shows the circuit logic of a single tree node of the switch fabric tree.

One single switching element of the routing tree is shown in FIG. 7. It consists of a latch circuit 83 and two AND gates 85 and 87. The latch circuit receives, on its data input D, the full stream of minipacket bits. In response to one single bit of this bit stream, which is selected by a specific clock pulse entering the clock input C, the setting of the latch will be selected. Thus, when the routing address bit associated with the respective stage of the tree has passed through it, the latch of this node will have the correct setting and will open either AND gate 85 for output one or AND gate 87 for output two, so that it forwards the arriving minipacket data stream to the desired output. No resetting of the node latches is necessary before the next minipacket is gated if certain inhibit circuits are provided, as will be seen in the detailed example to be described in the following.

(B) Detailed Example for First Embodiment:

A more detailed example for the first embodiment of the switch system will now be described in connection with FIGS. 8 through 15.

The following values and conditions were selected for this example:

Basic building unit=switch module having sixteen input ports and sixteen output ports; comprising sixteen routing trees each having one input branch and sixteen output branches Whole switching system having one-hundred and twenty-eight input ports and one-hundred and twenty-eight output ports; built as array of eight×eight=sixty-four basic switch modules Minipacket routing addresses are eight bits long:
  1 not used (reserve)
  3 for selecting module
  4 for selecting output port within module Two sizes of minipackets: either sixty-four bits or two-hundred fifty-six bits
  one byte (eight bits) for address
  one byte (eight bits) for control information (one bit for distinguishing short and long minipackets)
  the remaining six bytes or thirty bytes for data (and for CID if required)

Common clock system for all modules, i.e. all modules are bit synchronized (but each module has sixteen individual clock pulse counters, one for each input, started by a data indicator signal when a minipacket begins)

As is indicated above, the system is built up as an array of eight×eight basic modules each being a sixteen×sixteen array. Some details of this combination will be given later. However, it should be noted already that in each module of the array, three routing bits will be required for selecting one module out of a subgroup of eight modules (which are all connected to the same subgroup of sixteen system input ports), and four routing bits will be used for directing a minipacket within a module to the required one of the sixteen outputs.

Figure 8:
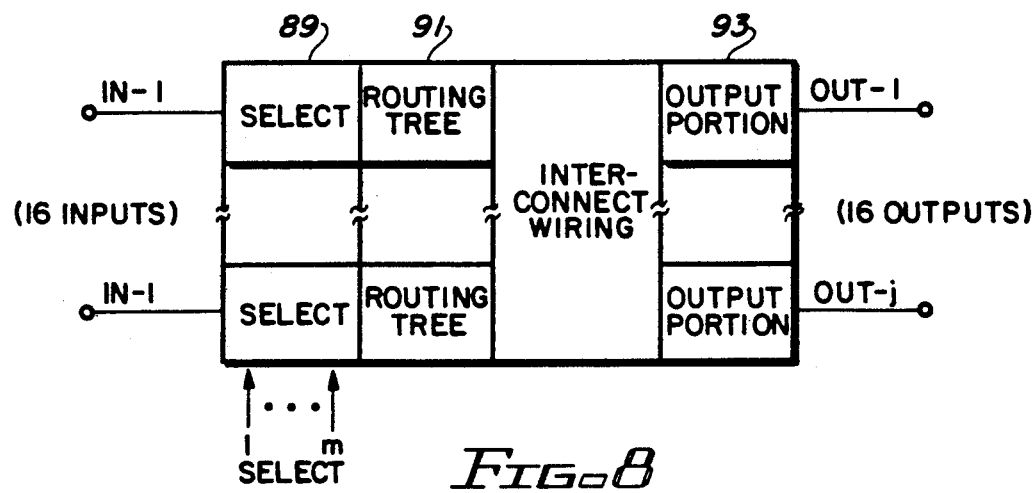
FIG. 8 is a survey diagram of the following figures which are a more detailed representation of the first embodiment.

A block diagram of the basic switch module is shown in FIG. 8. It has sixteen slices, and each slice consists of a selector portion 89 (shown in more detail in FIG. 10), a routing tree 91 (shown in more detail in FIG. 11), and an output portion 93 (shown in detail in FIGS. 12, 13, 14, and 15). The sixteen output terminals of each of the sixteen routing trees (one per slice), and the sixteen input terminals of each of the sixteen output portions (one per slice), are interconnected by a wiring network as was indicated already in connection with FIG. 4 (and FIG. 5).

It should be noted that on the input side, eight basic modules (forming a subgroup) are connected in parallel to one subgroup of sixteen system input ports (of the total of one hundred and twenty-eight inputs ports which are separated into eight subgroups). Thus, e.g. system input port 061 in the fifth subgroup of input ports (064 . . . 079) is connected in parallel to the input 003 of each of eight basic modules which form the fifth subgroup of modules (serving system input ports 064 . . . 079). On the output side, however, the one hundred and twenty-eight outputs of the eight modules forming the subgroup are each connected (through a buffer) to a different system output port (as will become apparent from the examples of FIG. 16).

The timing scheme for the whole system is illustrated in FIG. 9. It corresponds to the format of each minipacket. The first eight clock intervals C000 . . . C007 are associated with the address bits; the next 56 clock intervals C008 . . . C063 are associated with the fields CTL, CID (if necessary), and the information field of the short minipackets (the first bit time C008 being associated with the short/long indicator bit appearing as first bit in the output buffer). Three further groups of sixty-four bit intervals each (C064 . . . C127, C128 . . . C191, and C192 . . . 255) are associated with further sixty-four bit portions of the information field of long minipackets.

Figure 10:
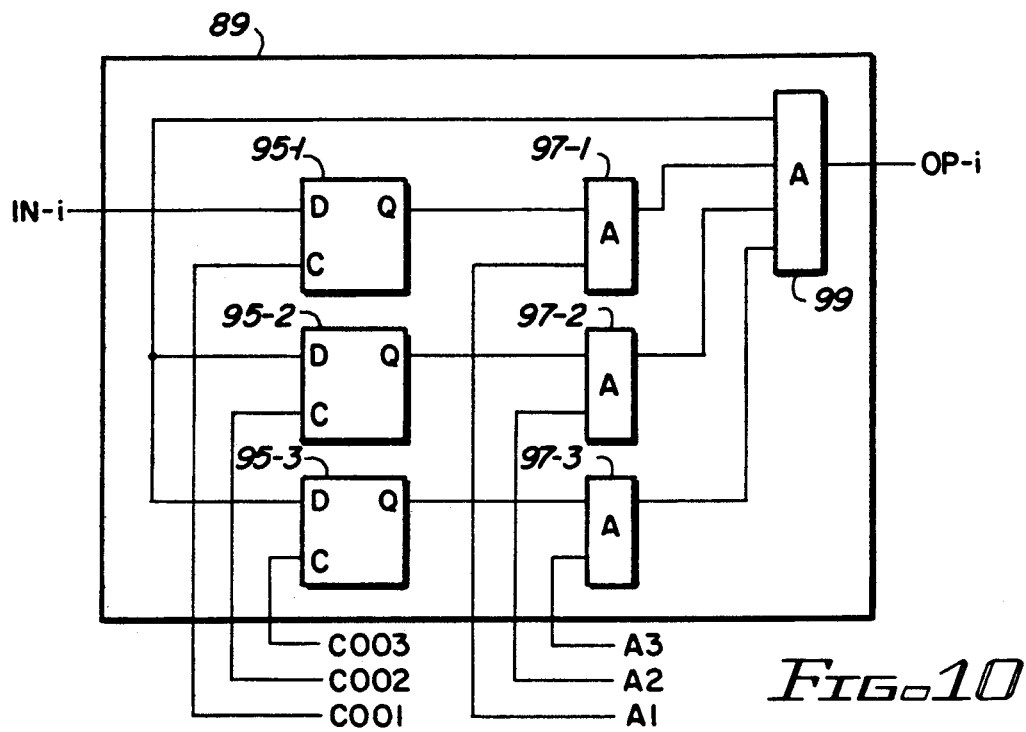
FIG. 10 is a block diagram of a module selector in a multiple-module switch implementation.

Selector Portion:

FIG. 10 is a block diagram of the selector portion 89 of each module slice. It comprises three latches 95-1, 95-2, 95-3, and four AND gates 97-1, 97-2, 97-3, and 99. Data inputs D of all three latches are connected to the input terminal of the respective slice, and each of the clock inputs C is connected to one of the three clock lines C001, C002, and C003. After occurrence of the three clock pulses C001 . . . C003, the setting of the three latches will reflect the first three address bits of the routing address of the incoming minipacket. Each of the eight selector portions in the slices i of eight modules of a subgroup, which are connected to the same system input port i, receives a different combination of binary values A1, A2, and A3 representing its selector address. The combination of these selector address bits and the setting of the three latches will condition only in one of the eight slices i of the respective module subgroup the selector to have its AND gate 99 opened for the following incoming address bits and data bits of the current minipacket. All other seven selectors will be inhibited until the next minipacket cycle starts.

Figure 11:
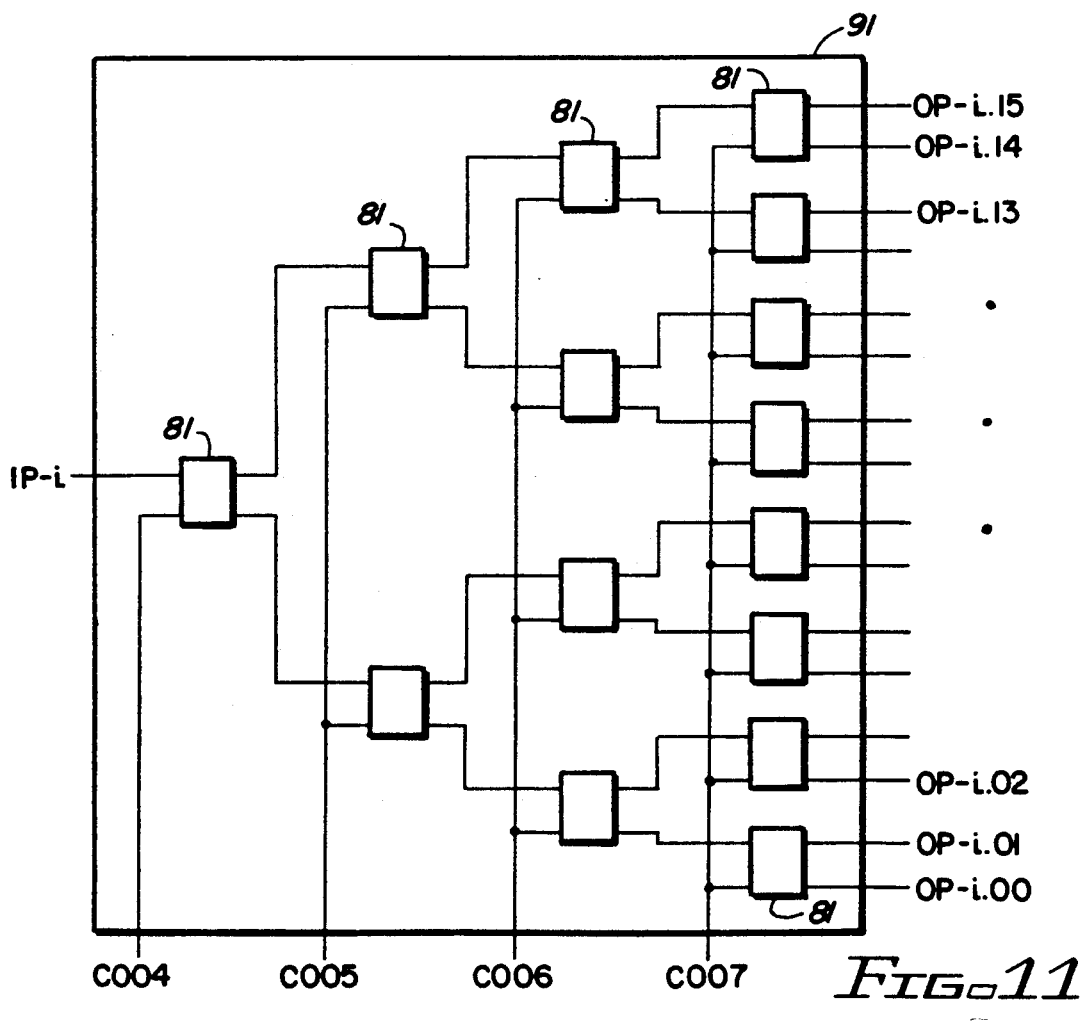
FIG. 11 shows one tree of the switch fabric with associated clock signals for the switch elements in the nodes.

Routing Tree:

FIG. 11 illustrates the routing tree 91 of one module slice, having one input IP-i and sixteen outputs OP-i.00 . . . OP-i.15. This figure corresponds to the tree 71 of FIG. 6 except that it additionally shows the clock signal lines. Each of the blocks is a switching element 81 as shown in FIG. 7. As can be seen, during clock interval C004, the setting of the single node circuit of the first (leftmost) tree stage is determined by the fourth address bit of the incoming minipacket, so that the fifth (and all following) address bits are gated either through the upper or the lower output. Similarly, during clock interval C005, the fifth address bit of the incoming minipacket will determine the setting of either the upper or the lower of the two node circuits of the second stage of the tree. At the end of clock interval C007, i.e. when all minipacket routing address bits have passed the tree, only one of the sixteen outputs will be connected to the single input. Thus, all the data bytes (and also the CTL and CID bytes) of the minipacket will be gated through that single output without any delay.

It should be noted that despite the random setting of the nodes at the start of a minipacket (which setting was determined by the previous, independent minipacket), causing the gating of initial address bits of the new minipacket to any output of the tree, this will have no effect because in the output portion 93, all address bits are inhibited and only data bits are gated into output registers.

Figure 12:
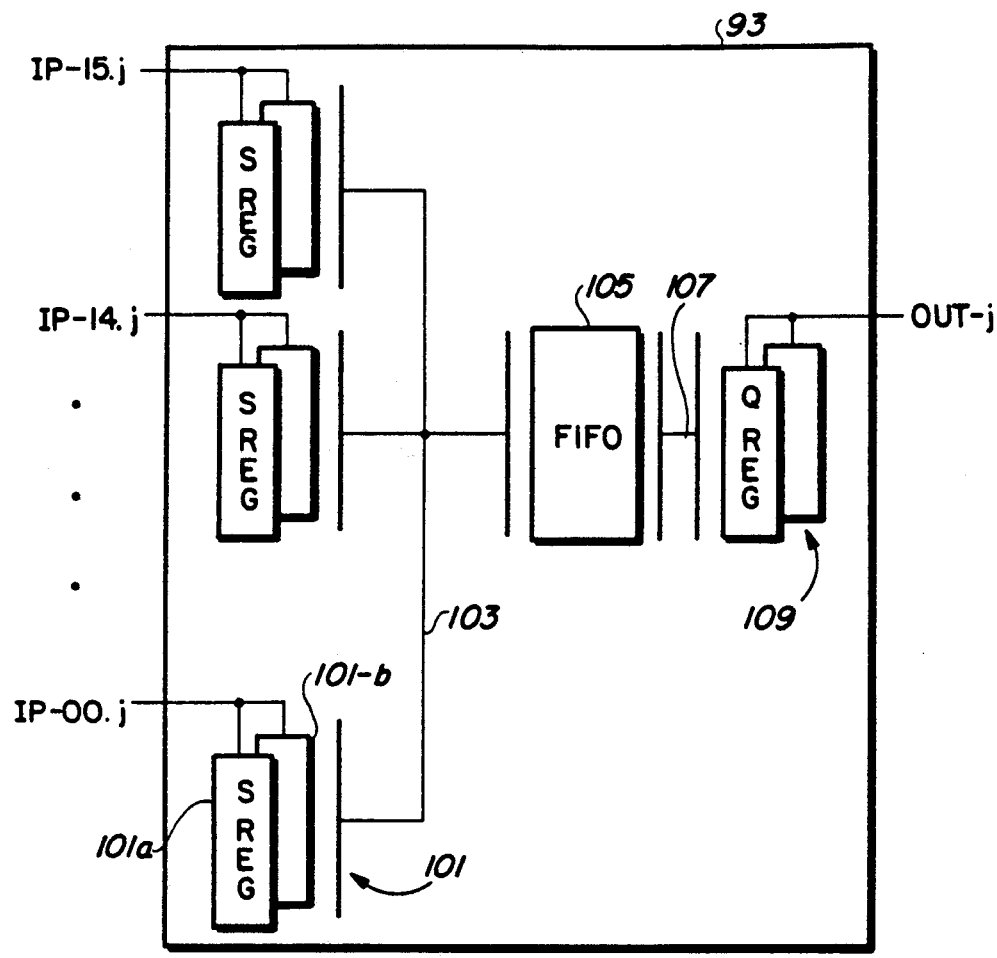
FIG. 12 is a survey block diagram of the output configuration of the first embodiment of the switch.

Output Portion:

The output portion 93 of each switch slice will now be described in connection with FIGS. 12 ... 15. FIG. 12 is a block diagram of all units of an output portion. There are sixteen inputs IP-00.j ... IP-15.j each connected to the j-th output (OP-i.j) of a different routing tree. To each input there is connected a pair 101 of shift register blocks (101a and 101b) which correspond to the minipacket shift registers 73 (MPSR) shown in FIGS. 4 and 5, and of which more details are shown in FIG. 13.

The outputs of all shift register blocks 101 are connected, via a common bus 103, to the input of a FIFO storage 105 which represents the FIFO queuing registers 77 of FIG. 5. The FIFO storage 105 is illustrated in more detail in FIG. 14. Output of the FIFO storage 105 is connected, via a bus 107, to an output shift register arrangement 109 which serves for sequentially shifting out the data of each minipacket received at the respective switch output port (OUT-j), to an output line which is connected to the input of the switch adapter of the respective output port (cf. FIG. 1 or FIG. 4).

Figure 13:
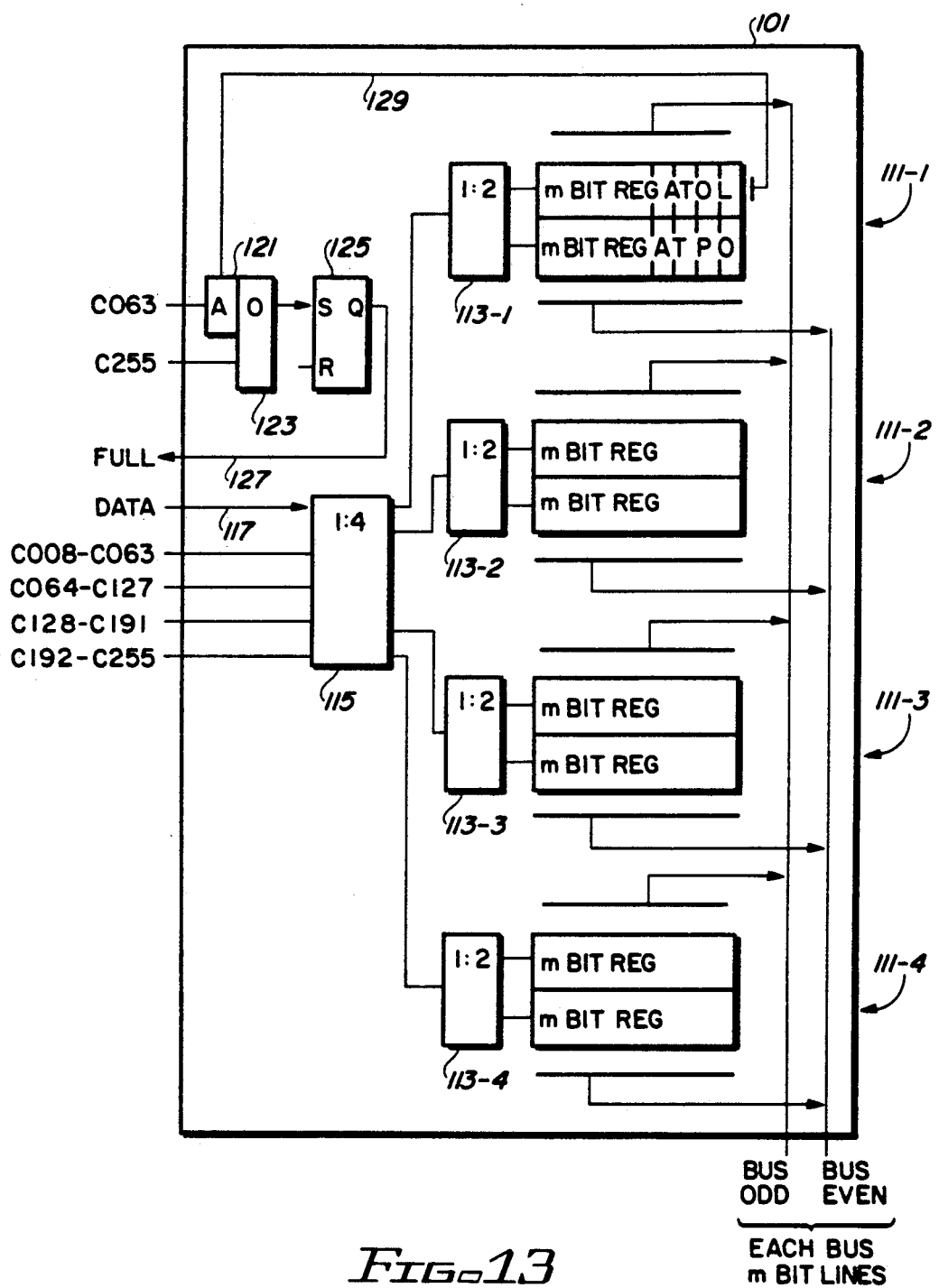
FIG. 13 illustrates the arrangement of minipacket shift registers for one output branch of a routing tree.

FIG. 13 is a block diagram of one shift register block 101a (two such blocks are provided as one shift register block pair 101). The heart of this arrangement is a group of four pairs of thirty-two bit shift registers 111-1 ... 111-4. The total capacity of these four shift register pairs is two-hundred and fifty-six bits which corresponds to one long minipacket. The two shift registers of each pair store consecutive bits of the minipacket bit stream alternatingly (to enhance speed). A demultiplexer 113 is provided for each shift register pair to switch inputs after each bit. Thus, the upper register of each pair holds odd-numbered bits and the lower one holds even-numbered bits. Bus 103 actually consists of an odd bus 103a and an even bus 103b which are connected to all odd shift registers or all even shift registers, respectively. Each bus has thirty-two parallel bit lines. Thus, the two registers of a pair can be read out in parallel.

For distributing the data bits of a minipacket to the different shift registers, a one:four selector 115 is provided. It receives the input data on a line 117 and gates them to one of four outputs which are connected to the four one:two demultiplexers 113-1 ... 113-4, respectively. Selector circuit 115 has four clock inputs which are up during clock intervals C-008 ... C-063, C-064 ... C-127, C-128 ... C-191, and C-192 ... C-255, respectively. During clock interval C-008 ... C-064, the incoming data bits are gated to the first shift register pair 111-1. Thus, the selector inhibits transfer of the first byte, i.e. the address bits, of each minipacket. The first byte stored in shift register pair 111-1 is actually the second byte of the minipacket, i.e. the control byte (LOOPTTAA as indicated in FIG. 13). This control byte includes as first bit the length indicator L, and also a priority bit P indicating whether the respective minipacket contains circuit switched data having high priority or packet switched data having lower priority.

It should be noted that the first shift register pair 111-1 will contain only fifty-six bits (because the eight address bits are not stored). When bit interval C-064 starts, selector 115 switches to its second output to gate the following sixty-four bits into shift register pair 111-2. The other two shift register pairs are filled during the clock intervals indicated at the third and fourth clock input of selector 115.

For developing an indicator signal when a full minipacket (either a short one or a long one) was received in the shift register block, an AND gate 121, OR gate 123, and a latch 125 with output line 127 are provided. Furthermore, a line 129 is provided which connects the bit position in shift register 111-1 holding the ninth bit of a minipacket (which is the first bit of the control field) to one input of AND gate 121 whose other input is connected to a line furnishing clock signal C-063. As was mentioned earlier, the first bit (L) of the control field of each minipacket indicates the length of the packet; it is zero for long packets and one for short packets.

If bit L is equal to one, AND gate 121 will produce an output pulse at clock time C-063, which pulse will set latch 125 so that it produces a "full" signal on line 127 which propagates to the FIFO control logic 135, indicating that the minipacket is ready to be stored in the FIFO. It also causes active input state of the shift register pair to change, allowing another minipacket to be stored while the just filled register awaits transfer to the FIFO. If the L bit is equal to zero, clock signal C-063 will have no effect but clock signal C-255 will set, through OR gate 123, latch 125 which only then (at the end of a long minipacket) will furnish a "full" signal on line 127.

Figure 14:
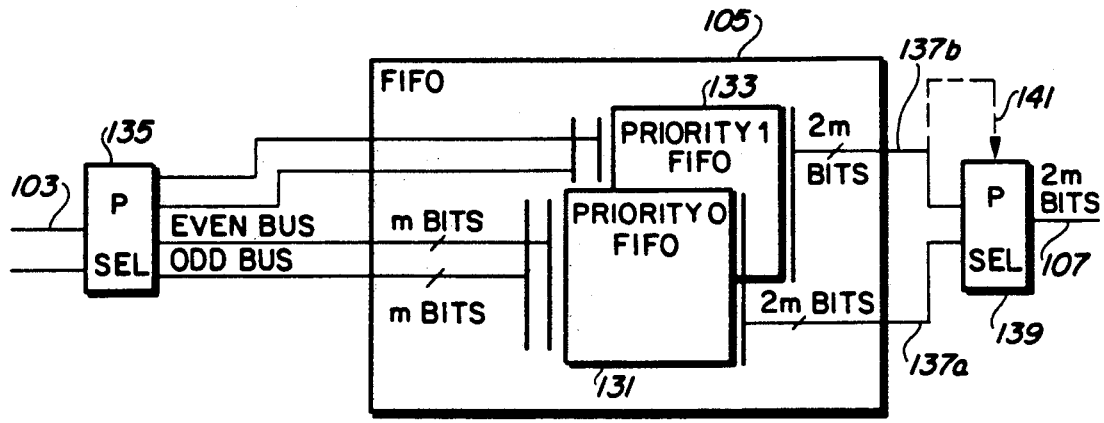
FIG. 14 represents schematically the output FIFO queue buffers and their interconnection.

A block diagram of FIFO storage 105 is shown in FIG. 14. It comprises two sections 131 and 133 for the two priorities 0 and 1. Bus 103, as was mentioned earlier, actually consists of two busses each for transferring in parallel thirty-two bits so that the contents of each shift register pair 111-i (i.e. sixty-four bits) can be transferred in parallel to the FIFO storage. A priority selector 135 is responsive to the priority bit of the minipacket (which appears on a specific one of the thirty-two parallel lines of bus 107) to gate the thirty-two bits either to FIFO 131 or FIFO 133. (The width of the FIFOs is such that one complete long minipacket can be stored in one row of the FIFO storage.) Each of the two FIFO stores has an output bus 137 carrying sixty-four parallel bits. A second priority selector 139 is provided to gate the contents of only one FIFO storage to output bus 107. An extra bit line 141 with bus 137b indicates whether the higher priority FIFO storage 133 still contains data or not. If no more data are waiting in FIFO 133, selector 139 switches to gate the data from bus 137a to output bus 107.

The present example provides two priorities. It is of course possible to have more than two priority categories. A respective number of FIFO queue stores would have to be provided (and of course a sufficient number of priority bits in the control byte of the minipacket format).

Reading-out of FIFO buffer stores 131 and 133 occurs under control of output control logic (not shown). Any time either FIFO has one or more minipackets stored (FIFO not empty), the output control will cause a minipacket to be forwarded to the output register (FIG. 15) via priority selector 139. The priority FIFO is always served until it is empty, then the normal FIFO is serviced.

Figure 15:
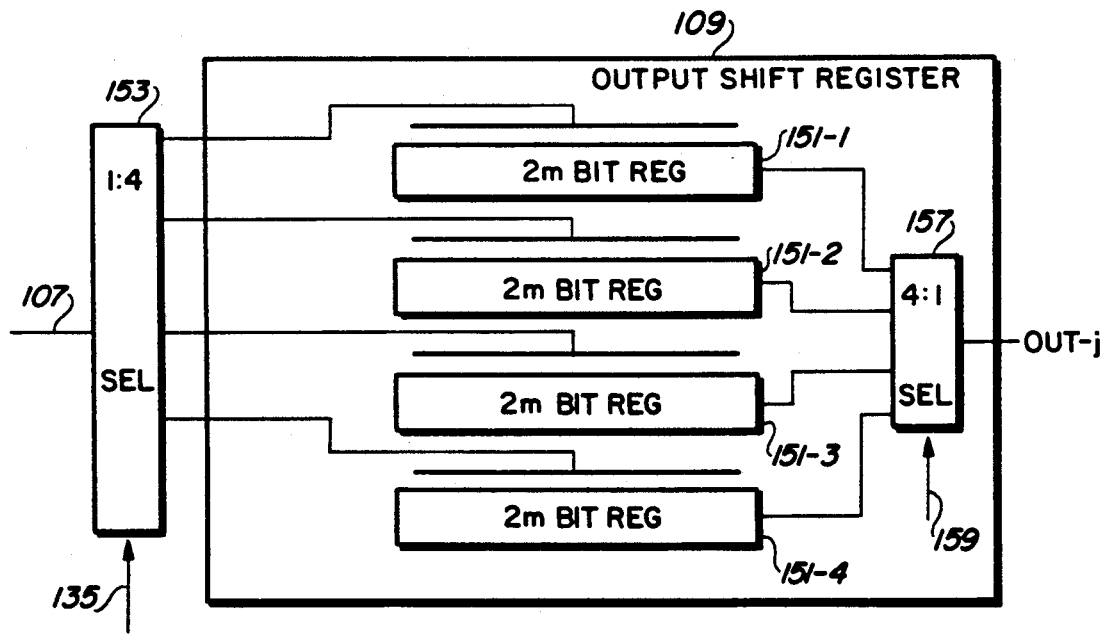
FIG. 15 shows the arrangement of output shift registers for one output port of the switch fabric.

The output shift register arrangement 109 is shown as a block diagram in FIG. 15. It comprises four shift registers 151-1 ... 151-4 each with a capacity of sixty-four bits. These shift registers are loaded in parallel and read out sequentially, i.e. they are actually parallel-to-serial converters. A one:four selector 153 distributes the sixty-four parallel bits of each block which arrive on bus 107 to the four shift registers 151-1 ... 151-4. The selector is controlled by a signal on line 155 from the output control logic. A four:one selector 157 selects the four shift registers in sequence for transferring their contents in bit-serial form to output line OUT-j which represents output port j of the switch and which is connected to a respective switch adapter (cf. FIGS. 1 and 4).

Once a segment of the output shift register 109 has been loaded, the selector 157 starts shifting that segment out through the output j provided the output has received an active control signal on line 159. Control signal on line 159 comes from the output control logic. Each output has associated with it two external signal lines: token receive and token send. (This is needed when output links of several modules are tied together in multi-module stages as exemplified in FIGS. 16B, 16C, and 16D.)

When the output has received a token and has a minipacket with priority equal or higher than the token, the control signal on line 159 can then be activated upon the indication that no other minipacket is being sent on the output lines. When the control line 159 is activated and a minipacket has been started, the received token is sent onto the token send line to the next linked output. If no other links are tied to output j, the token send line is connected to the token receive line.

Combination of Basic Modules to Form Larger Switches:

As was indicated above already and was assumed for the detailed embodiment described, larger switching systems can be formed by combining a plurality of the basic sixteen × sixteen switch modules described. FIGS. 16 and 17 illustrate schematically some of the possibilities.

Figure 16A:
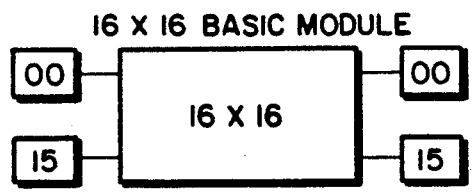
FIG. 16A to 16D schematically illustrates the combination of basic switch modules for forming higher capacity switches.
Figure 17:
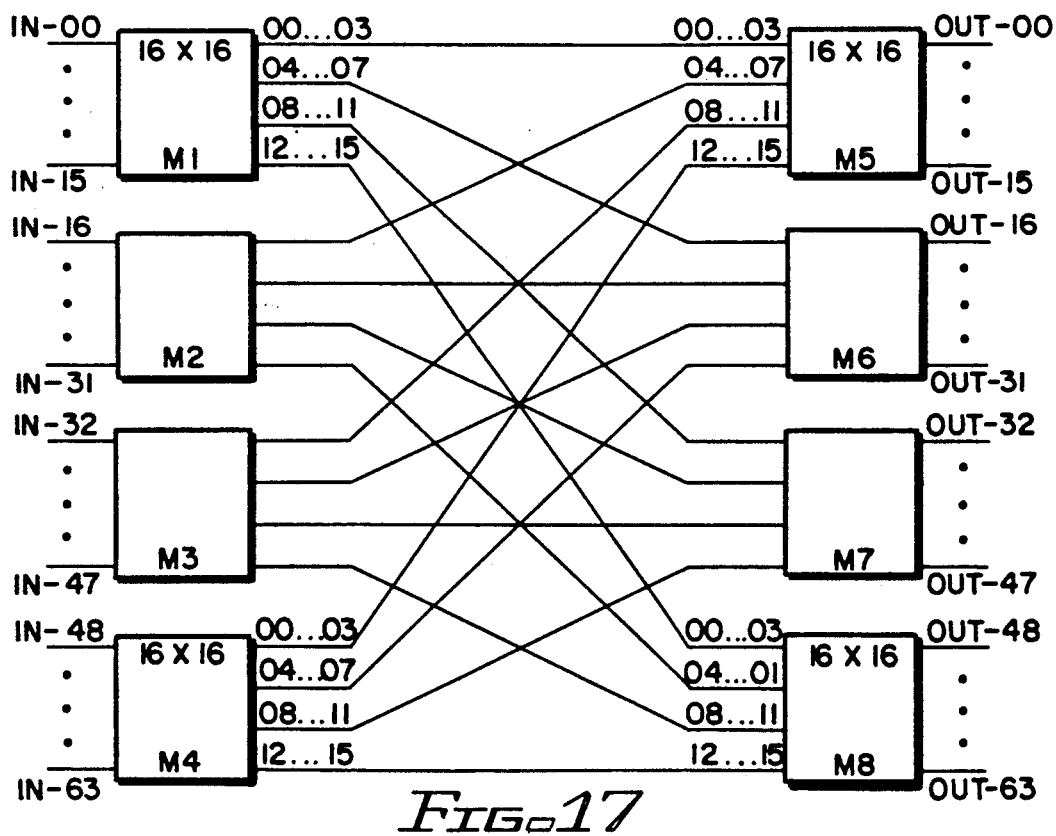
FIG. 17 illustrates how a 64×64 switch can be built using only basic 16×16 switch modules as shown in FIG. 16A.

In FIG. 16A there is shown the basic sixteen × sixteen module which has sixteen input ports and sixteen output ports and consists of sixteen routing trees as shown in FIG. 11. In addition, a module selector as shown in FIG. 10 is attached between each of the sixteen input ports and the entrance terminal of the respective routing tree. Furthermore, at each output branch of each routing tree there is provided a minipacket shift register arrangement for one minipacket (similar to that shown in FIG. 13).

Figure 16B:
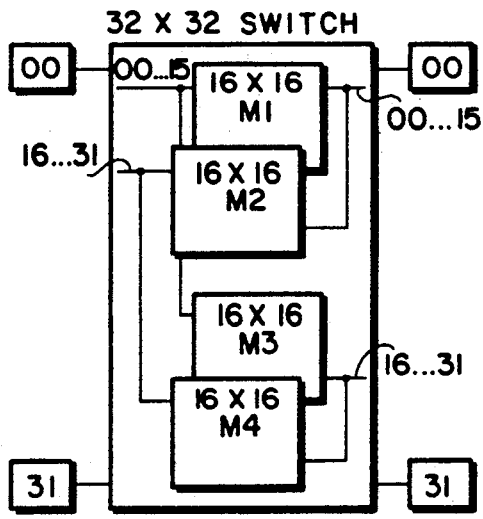

FIG. 16B shows how four such basic modules can be combined to form a thirty-two × thirty-two switch (or supermodule). In this case, only one selector bit need be used to distinguish between two modules (M1/M3 or M2/M4); i.e. of the three selector bits in the routing address, the first two can be kept zero and the third designates the required output module. Two modules M1 and M2 are connected to form a path between the thirty-two switch inputs and the first sixteen switch outputs. Input ports of M1 are connected to switch inputs 00 through 15, and input ports of M2 are connected to switch inputs 16 through 31. Each of switch outputs 00 through 15 is connected in parallel to the two equal-numbered output ports of both modules M1 and M2. Similarly, the two modules M3 and M4 are connected to form a path between all thirty-two switch inputs and the second sixteen switch outputs (i.e. outputs 16 ... 31).

Figure 16C:
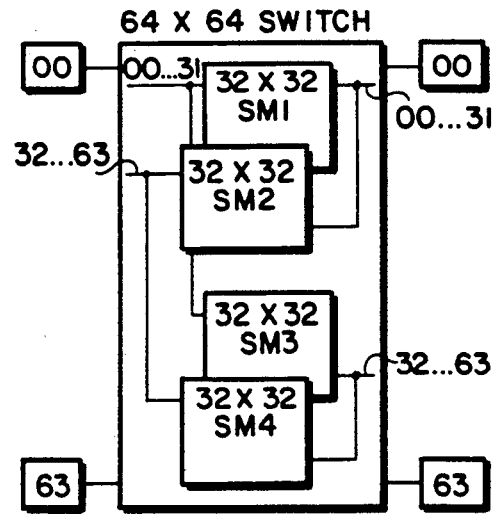

FIG. 16C shows how four of the thirty-two × thirty-two supermodules shown in FIG. 16B can be combined to form a sixty-four × sixty-four switch (connections being made in an analogous manner as for the switch of FIG. 16B). In this case, two selector bits should be provided in the routing addresses: The first could be kept always zero, the second would indicate the supermodule selection, and the third would indicate the basic module selection as described already in connection with FIG. 16B. The second selector bit in each address, i.e. the supermodule selector bit, would cause the selection between two parallel supermodules (either SM1 and SM3, or SM2 and SM4) in the arrangement of FIG. 16C.

Figure 16D:
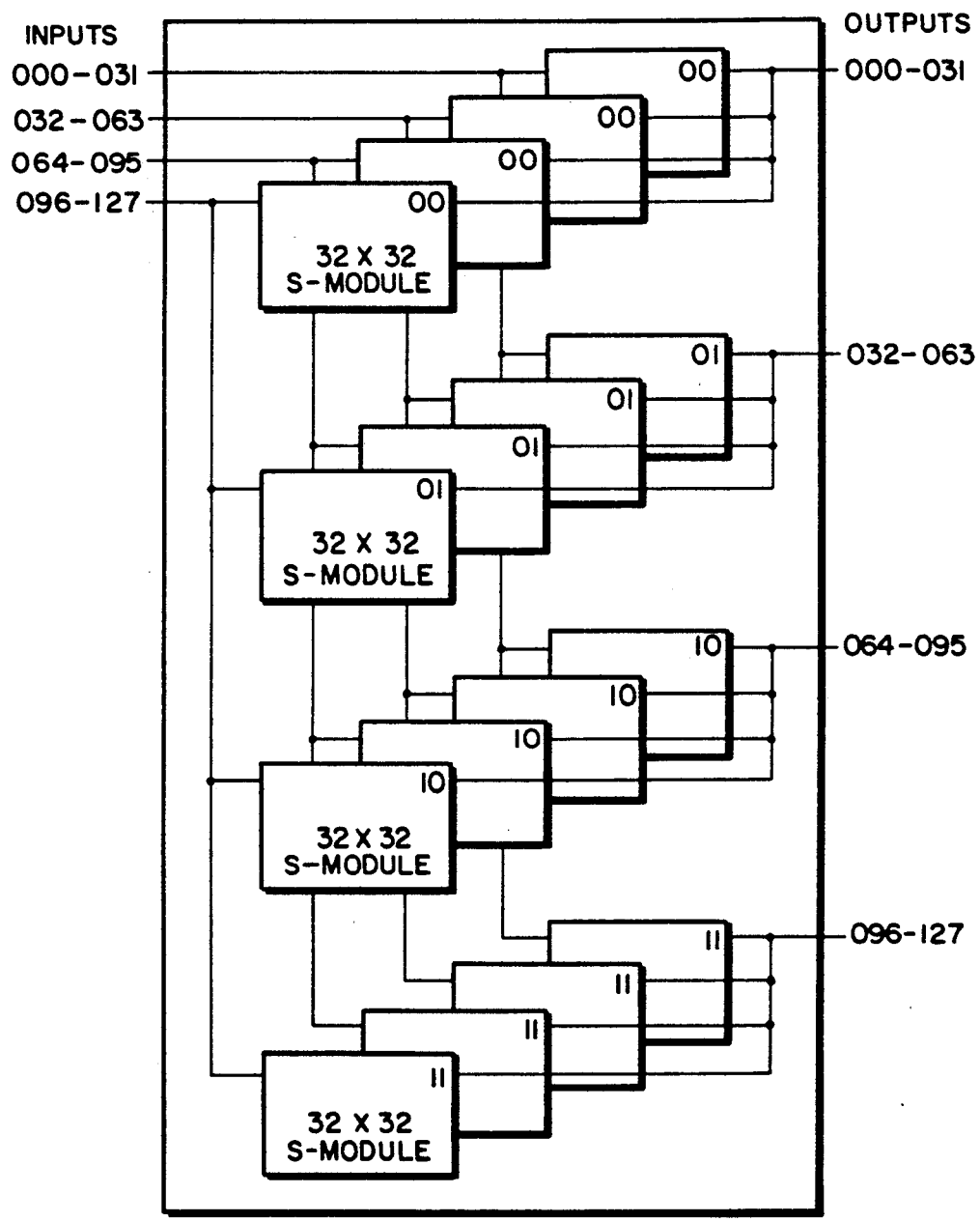

FIG. 16D illustrates how sixteen of the thirty-two × thirty-two supermodules shown in FIG. 16B could be combined to form a one-hundred and twenty-eight × one-hundred and twenty-eight switch configuration. No further explanation need be given on interconnections because they would be analogous to those for the switches of FIG. 16B and FIG. 16C. However, all three module selector bits of the routing addresses in the minipackets would have to be used in this case. The first two selector bits distinguish between four parallel supermodules (as indicated by the two-bit addresses shown in the upper right corners of the supermodules in FIG. 17). The third selector bit determines one of the two parallel basic switching modules in a supermodule. Actually, the selection is made by the three selector bits within those basic switching modules in the supermodules, which are connected to the input ports.

It should be noted that a one-hundred and twenty-eight × one-hundred and twenty-eight switch could not only be formed by interconnecting a four by four array of sixteen (thirty-two × thirty-two) supermodules, but also by interconnecting an eight by eight array of sixty-four basic sixteen × sixteen modules, as was assumed in the case for which a detailed description was given above (with reference to FIGS. 8 and 10). In this case, all three selector bits are used to distinguish between eight parallel basic modules forming one subgroup, each of said eight parallel basic modules being connected to another group of sixteen switch output ports but all of which are connected to the same group of sixteen switch input ports.

The fabric configurations shown in FIGS. 16B, 16C, and 16D have the same full switching capabilities as each single basic sixteen × sixteen switching module (FIG. 16A).

It is however possible to build staged combinations for increasing the number of input/output ports, which use less basic sixteen×sixteen switching modules than the previously explained extension combinations. This saving in modules has to be traded in, however, for a possible longer delay in the switch (accumulation of delays in buffers). Anyway, no adaptations have to be made to the basic modules for combining them in this staged manner.

FIG. 17 shows the principle of the staged combination for the case of a sixty-four×sixty-four switch. Four input modules are connected to four output modules in such a way that from each input module, a minipacket can be gated to any output module. Each line in the drawing represents four separate connecting lines, each of which connects one module output to one module input.

Figure 18:
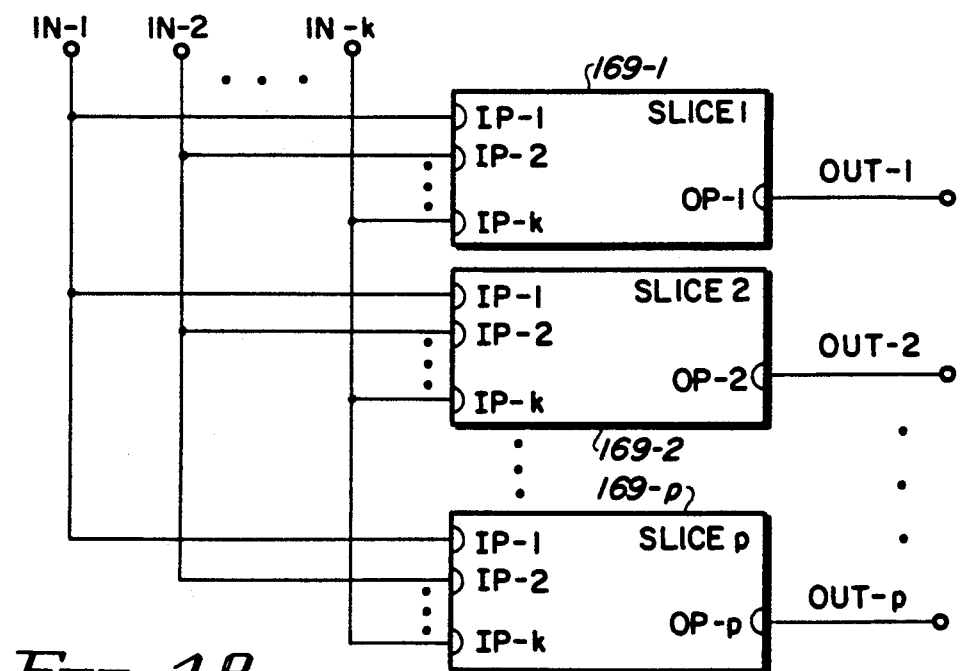
FIG. 18 schematically illustrates the structure of a second embodiment of the high speed switch.

(5) Second Embodiment of Switch Fabric:

In the second embodiment, the switch fabric consists of a plurality of switching slices 169, each of which connects all input ports to one particular output port, as is shown in FIG. 18. Thus, for a sixteen×sixteen switch, there would be provided sixteen switching slices each having sixteen inputs and a single output.

It is assumed that the size of each minipacket is an integer multiple of a basic segment size which is a power of two. As in the first embodiment described above, the basic segment size in this second embodiment is k=64, and the minipacket sizes used are either sixty-four bits or two-hundred and fifty-six bits (short or long minipacket).

Figure 19:
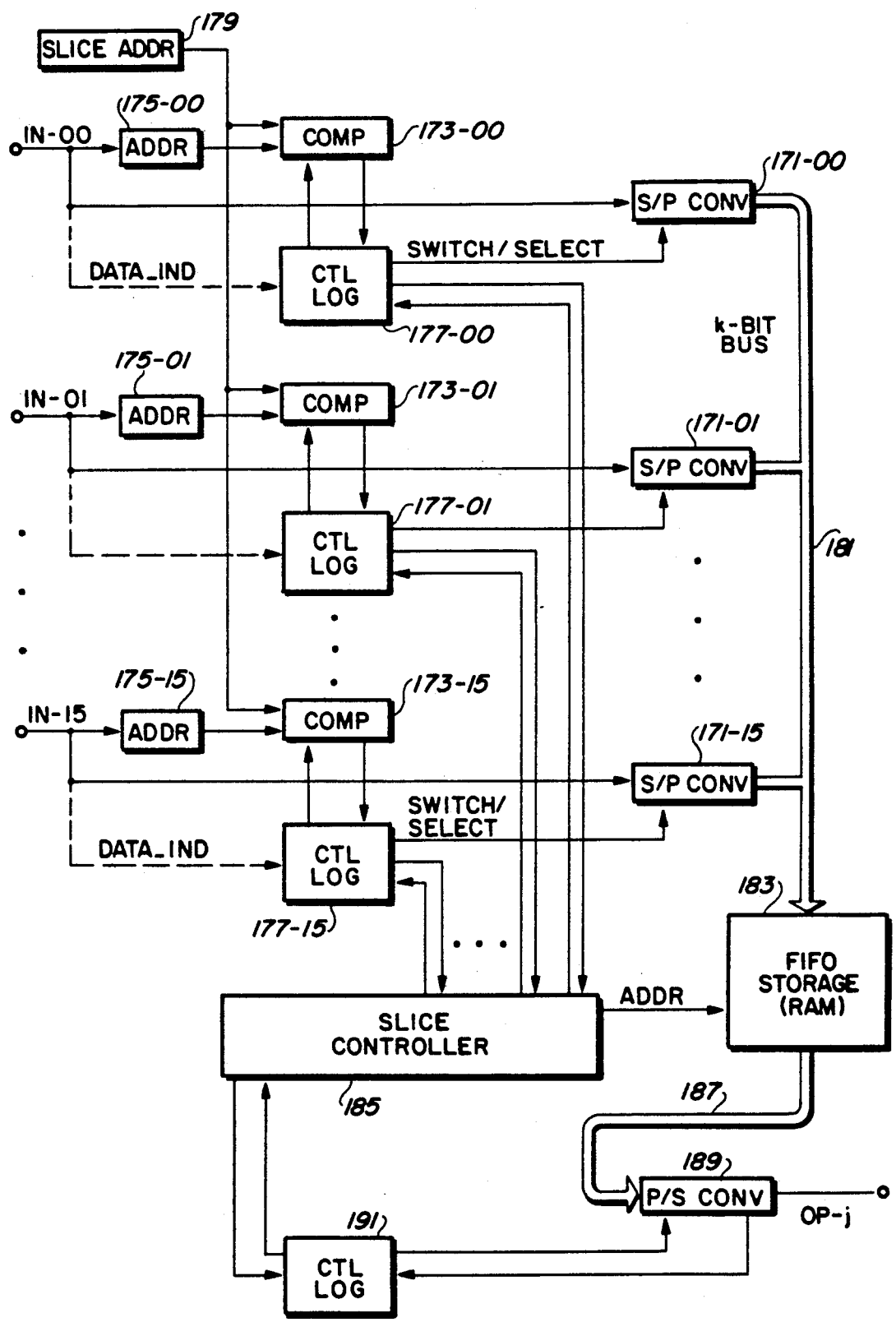
FIG. 19 is a more detailed block diagram of one slice of the second embodiment.

A block diagram of one switching slice 169 is shown in FIG. 19. The switching slice comprises for each input port.
one k-bit serial-to-parallel converter 171 comprising:
two registers which can both hold a whole basic segment of k bits,
one address comparator 173 with an associated address separator 175, and
control logic 177.

Each S/P converter 171 is directly connected to its associated input IP-i. Each comparator 173 has one of its inputs connected to the associated address separator 175, and the other one to a common local slice address register 179 which holds the address of the associated output port of the respective slice. Output of the comparator is connected to an input of control logic 177. Whenever the first bits of a minipacket arrive at an input IP-i, the address bits are copied in the address separator 175-i. They also flow into that one of the two registers of S/P converter 171-i, which is presently empty. This occurs in all slices simultaneously for the input IP-i of each slice.

When the right amount of address bits has been received (which is determined by an output pulse of control logic 177-i), the contents of address separator 175-i is compared to the contents of local slice address register 179. If the addresses match, nothing happens. More data will flow into the S/P register until a count of k is reached. Then a request latch is set, indicating a request for service by the respective S/P converter. That request is scanned by slice controller 185 (see below). When the address compare is negative (addresses do not match), the process is stopped in control logic 177-i by a pulse from the comparator. No request for service will be generated.

It should be noted that, if the minipacket size is a multiple of the basic segment size k, S/P converters 171 must convert each segment of a minipacket separately so that the minipacket is chopped into basic segments. Each S/P converter 171 comprises a pair of registers each of basic segment size (k bits) and suitable control so that the two registers will be used alternatingly for serial data insertion and parallel read-out.

Some additional detail of the control logic and operation of one S/P converter is explained further below in connection with FIG. 20 (A and B).

All S/P converters 171-00 . . . 171-15 are connected by a common bus 181 to a minipacket FIFO storage (RAM) 183. Write and read operations in the FIFO storage 183 are controlled by a slice controller 185. Bus 181 is k bit wide so that a whole basic segment (k bits), i.e. the full contents of one S/P converter register can be transferred in parallel.

The output of minipacket FIFO storage 183 is connected by a bus 187 which is also k bits wide to a common parallel-to-serial converter 189. This P/S converter is similar to the S/P converters 171 in that it also comprises two registers which each can hold a whole basic segment of k bits, and which are used alternatingly. The output of P/S converter 189 is connected to that output port of the switch fabric which is associated with the respective slice. Control logic 191 (similar to control logic 177) is provided for the output P/S converter 189. Its function and operation is described later in connection with FIG. 21.

The FIFO storage 183 must have a word size which is equal to the bus width and the basic segment size, i.e. k bits. Slice controller 185 must assure that all portions (segments) of a large minipacket are kept together; i.e. as the large minipacket size is two-hundred and fifty-six bits and k=64 bits, four consecutive storage locations must be provided in FIFO storage 183 for holding the four segments.

Furthermore, FIFO storage 183 is logically divided into two separate FIFO spaces for two priority categories (e.g. one for circuit switched and the other for packet switched data). A priority bit in each minipacket which can be recognized by slice controller 185 must control the directing of each minipacket into the correct priority space of the FIFO storage. An output server which is part of slice controller 185 causes consecutive read-out of minipackets (segments) from the FIFO storage, and it first empties the space of the higher priority class before reading out minipackets (segments) from the lower priority class space.

Figure 20A:
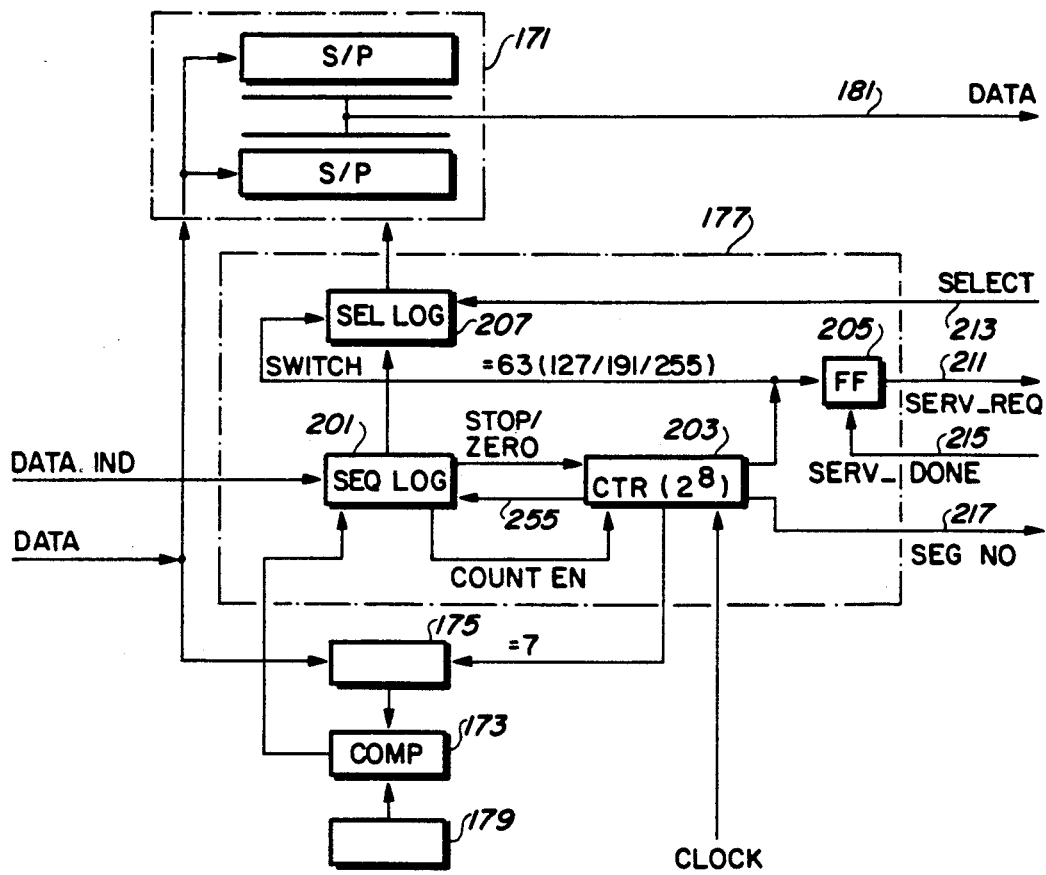
FIGS. 20 (A and B) shows details of the control logic of one S/P converter in a switch slice as shown in FIG. 19, and a status diagram for this control logic.

Operation of the S/P converter and its control logic is now explained with reference to FIG. 20A and 20B. In FIG. 20A there are shown some details of control logic 177 in connection with the S/P converter (register pair) 171, comparator 173, and address separator 175. Control logic 177 comprises a sequencing logic 201, a counter 203 having a capacity of two-hundred and fifty-six, a latch 205 and S/P converter select logic 207. Also provided is a data indicator line 209 which is a parallel line to the data input line; the input switch adapter which is connected to the respective input IP-i raises the data indicator signal on line 209 as long as it transmits data bits on the data input line.

Figure 20B:
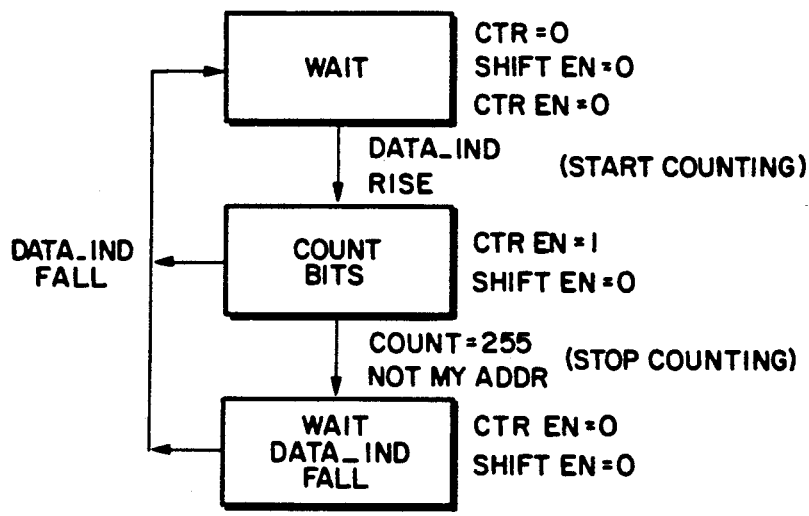

The different states of the sequencing logic 201 and the events causing a transition between states are shown in FIG. 20B. Initially, the sequencing logic is in a WAIT state, and its output signals keep the counter contents at zero and do not enable counting or shifting of data from the S/P converter registers. When the data indicator signal on line 209 is raised, the sequencing logic goes to a COUNT state in which it enables bit counting by counter 203 (which receives bit clock pulses on its input). At a count of 8 (eight address bits plus priority indicator bit received) the address comparator is enabled. If the addresses do not match, a control pulse is sent to the sequencing logic which then enters its third state WAIT FOR DATA INDICATOR FALL in which it disables further counting and also disables shifting of S/P converter contents. Thus, when the address of the minipacket does not fit to the address of the respective slice, nothing further will occur until the data indicator signal on line 209 falls, which will bring the sequencing logic back to its WAIT state, resetting the counter contents to zero.

However, if the addresses match, sequencing logic will stay in the COUNT state and the counter will be further advanced. When a count of sixty-three (or one-hundred and twenty-seven or one-hundred and ninety-one or two-hundred and fifty-five) is reached, i.e. when a minipacket segment of sixty-four bits has been stored in one of the S/P converter registers, a counter output pulse will set service request latch 205 and it will also cause a switchover of S/P converter select logic 207. Logic 207 will then select the recently filled register of S/P converter 171 for transfer of its contents to bus 181, and connect the other register of the pair to the data input line for now receiving serially incoming data bits.

When slice controller 185 scans the respective S/P converter and detects a service request on line 211, it addresses a storage word in FIFO storage 183 and sends a select signal on line 213 to the S/P converter select logic 207 which will then release the contents of the filled S/P converter register to bus 181. Latch 205 is then reset by a service-done pulse on line 215.

If the minipacket contains four segments, this switchover and data transfer procedure will occur three more times. When the count reaches two-hundred and fifty-five, a pulse is sent to sequencing logic 201 which will then transit to the WAIT FOR DATA INDICATOR FALL state, and will return to the WAIT state (resetting the counter to zero) when the data indicator signal on line 209 is down. he two most significant bits of counter 203 are copied at counts sixty-three, one-hundred and twenty-seven, one-hundred and ninety-one, and two-hundred and fifty-five and are made available to slice controller 185 on line 217, as segment count value. They indicate whether the first, second, third, or fourth segment of a minipacket is presently received, and thus allow the slice controller to correctly address FIFO buffer 183.

Figure 21:
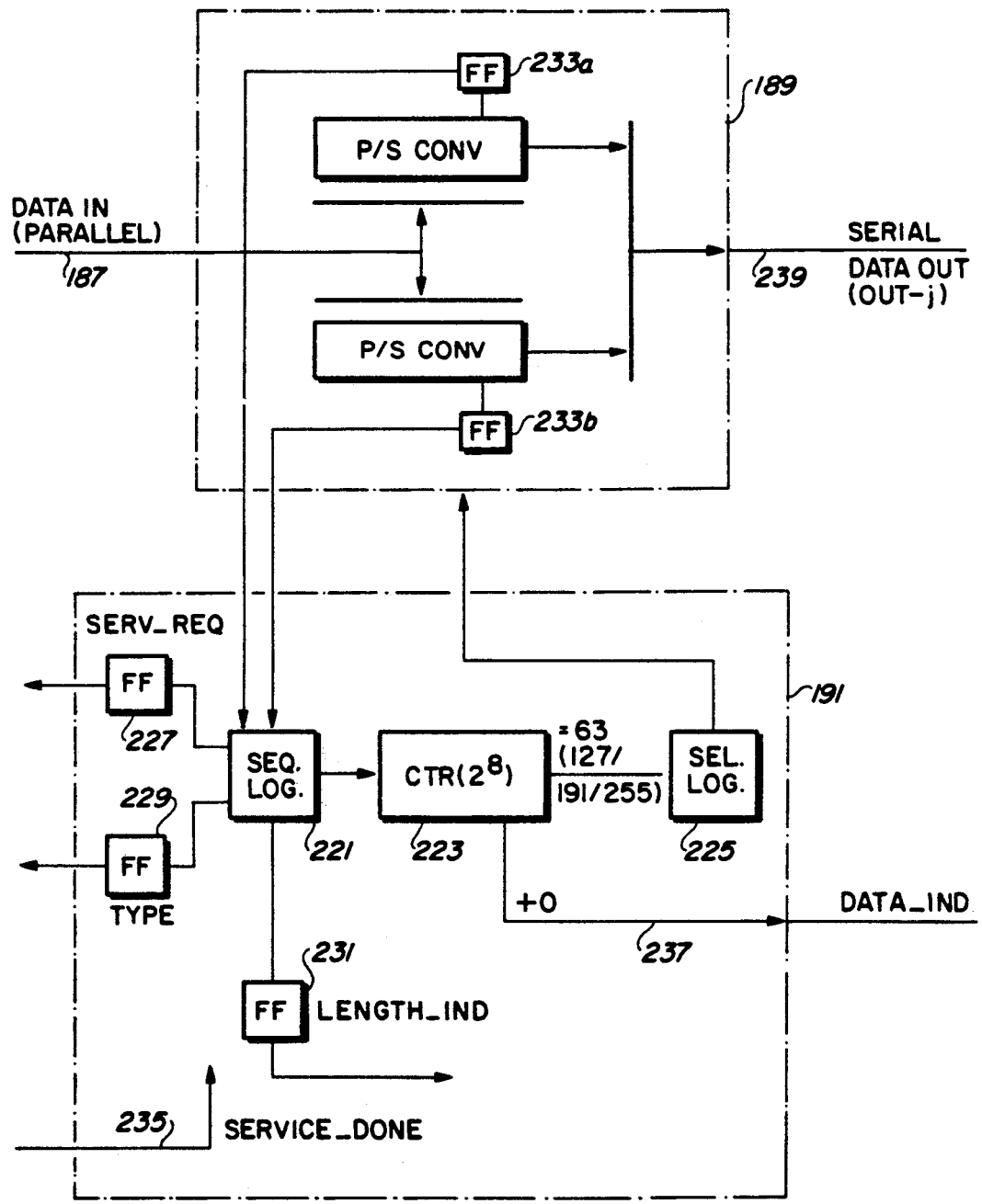
FIG. 21 shows details of the control logic of the output P/S converter in a switch slice as shown in FIG. 19.

FIG. 21 is a block diagram of control logic 191 of the P/S converter 189. It operates in a manner analogous to that of S/P converter control logic 177 described above. Control logic 191 comprises sequencing logic 221, a counter 223 having a capacity of 256, selection logic 225 for the P/S converter registers 189, and a service request latch 227, a transfer-type latch 229, and a length indicator latch 231. Two latches 233a and 233b are provided in connection with the P/S converter registers for indicating whether they contain data or not.

A service request has to be generated from the P/S converter (by setting service request latch 227) when it needs a minipacket from the FIFO buffer storage 183. This is the case whenever at least one of the two registers of the P/S converter is empty, which is determined by ORing the output signals of latches 233a and 233b. If a request for service is honored (by transferring a minipacket (or segment) from the FIFO buffer over bus 187), service request latch 227 is reset and the appropriate one of the empty-indicator latches (233a, 233b) is reset by a service-done signal on a line 235. As long as counter 223 has a contents not equal to zero, a data indicator signal is active on a line 237, and data is transmitted bit-serially over the data output line 239 (OUT-j).

Addressing of FIFO storage 183 by slice controller 185 is effected as follows: For each of the two priority sections, there is a register for a NEXT-FREE pointer (designating the next free 256-bit block where a minipacket is to be stored) and a register for a NEXT-OUT pointer (designating the next two-hundred fifty-six bit block from which data is to be read). Furthermore, one current-minipacket address register is provided for each input S/P converter. This register holds a minipacket FIFO address for the respective input until all four segments have been stored.

When an S/P converter requests service, the following happens depending on the two-bit segment number indicator (available on line 217):

(a) If a first segment is indicated (number 00), the slice controller fetches a new FIFO storage address from the NEXT-FREE pointer register; stores the received segment at that address; and retains the FIFO storage address in the current-minipacket address register for the respective input (S/P converter). Contents of the NEXT-FREE pointer register is incremented so that it points to the next following 256-bit storage block.

(b) If a second, third, or fourth segment is indicated (numbers 01, 10, 11), slice control does not fetch a new address from the NEXT-FREE pointer register but rather uses the old FIFO address stored in the respective current-minipacket address register and amends it by the segment count to access the correct quarter-portion of the respective two-hundred and fifty-six bit storage block.

The slice controller also receives a priority indicator bit from the respective S/P converter 171 to initially select the correct priority section of FIFO storage 183 when a first segment (count 00) is received.

Correct sequencing of segmented minipackets occurs as follows:

The request for service from the P/S converter is accompanied by a signal indicating the type of request, i.e. whether a new minipacket is expected or whether trailing segments of a minipacket are required. If a comparison of the NEXT-OUT pointer and the NEXT-FREE pointer reveals that the FIFO is empty, then a request for a new minipacket is not honored. A request for a trailing segment (to complete a previously started minipacket transfer) is always honored. Memory space in the FIFO storage is allocated in blocks which can store long minipackets (four segments, two-hundred and fifty-six bits). A short minipacket gets an allocation slot for a long minipacket, which leaves some space unused. This is done to keep the control logic within reasonable bounds.

Modular construction as shown in FIGS. 16 and 17 is also possible with the switching slices of this second embodiment. In this case, the basic module is constituted by an arrangement of switching slices as shown in FIG. 18; several such modules would be interconnected as shown in FIGS. 16 and 17 to serve an increased number of input ports and output ports.

While the invention has been described in terms of a preferred embodiment in a specific environment, those skilled in the art will recognize that the invention can be practiced, with modification, in other and different environments within the spirit and scope of the appended claims.

Having thus described our invention, what we claim as new and desire to secure by Letters Patent is set forth in the following claims:

1. Apparatus for transferring packet switched or circuit switched information from a plurality of incoming transmission links connected to an input switch adapter means through a self-routing switching fabric means to an output switch adapter means to a plurality of output ports attached via an output switch adapter means to a plurality of outgoing transmission links employing a plurality of minipackets, comprising:
   (a) input switch adapter means for receiving the packet switched or circuit switched information from the incoming transmission links and for forming a minipacket from the packet switched or circuit switched information including a local routing address;
   (b) self-routing switching fabric means consisting of at least one set of parallel switching slices and having a plurality of input ports and output ports, the parallel switching slices having non-overlapping paths between input ports and output ports, the input ports receiving the minipackets from the input switch adapter means and sending the minipackets through the self routing switching fabric to an output port specified in the local routing address; and
   (c) output switch adapter means for joining the output port of the self-routing switching fabric means to an outgoing transmission link and for converting the common information format to packet switched or circuit switched information to transmit on the outgoing transmission link.

2. Apparatus as recited in claim 1, further comprising means for transferring each minipacket to an output port in response to the local routing address.

3. Apparatus as recited in claim 1, further comprising means for buffering each minipacket received at an output port and transferring its contents through an output switch adapter to an attached outgoing transmission link.

4. Apparatus as recited in claim 1, further comprising:
   (a) a plurality of routing trees in the self-routing switching fabric having an input branch connected to an input port and a plurality of output branches each joined to an output port;
   (b) means for responding to a portion of the local routing address of a minipacket received at an input branch;
   (c) means for forwarding the sequential bits of the minipacket to a selected one of the output branches;
   (d) means at each output branch of a routing tree for holding a minipacket; and
   (e) output server means at each output branch for sequentially gating minipackets to the respective output port from the holding means of the output branches.

5. Apparatus in accordance with claim 1, further comprising attachment means for interconnecting a plurality of switch modules, each of the switch modules comprising input switch adapter means, self-routing switching fabric and output switch adapter means, in parallel.

6. Apparatus in accordance with claim 1, wherein the switch fabric means comprises a plurality of switch slice means for linking an output port with an input port.

7. Apparatus in accordance with claim 6, wherein the switch slice means, includes:
   (a) serial-to-parallel converter means for connecting an input of the switch slice means with an output of the switch slice means and receiving incoming minipackets;
   (b) common First-In First-Out (FIFO) buffer storage means in the switch slice means for storing minipackets;
   (c) parallel bus means for connecting an output of the serial-to-parallel converter means to an input of the FIFO buffer storage means;
   (d) parallel-to-serial converter means for connecting the output of the FIFO buffer storage means to an output of the switch slice means; and
   (e) control means for sequencing the transfer of minipackets from each serial-to-parallel converter means to the FIFO buffer storage means and from the FIFO buffer storage means to the parallel-to-serial converter means.

8. Communication switching apparatus comprising a switch fabric with a plurality of input ports and output ports each connected to at least one transmission link for carrying packet switched or circuit switched traffic, comprising:
   (a) switch adapter means at each input port for forming uniform minipackets containing either packet switched or circuit switched information received on each transmission link, and routing information identifying an output port to transfer the minipacket to;
   (b) self routing switching fabric comprising a plurality of multiple-state switching trees, one multiple-stage switching tree for each of the input ports, each of the plurality of multiple-stage switching trees having an input branch connected to the respective input port and a plurality of output branches each for connection to a unique one of the output ports, for transferring each minipacket from the respective input branch to one of the output branches in response to the routing information;
   (c) output buffering means at each output branch of each of the multiple-stage switching trees for holding at least one minipacket; and
   (d) multiplexing and queue buffering means at each output port, for transferring the contents of each minipacket received in each of the output buffering means associated with the respective output port, to a transmission link connected to the respective output port.

* * * * *